(12) United States Patent
Berger et al.

(10) Patent No.: US 7,149,596 B2
(45) Date of Patent: Dec. 12, 2006

(54) APPARATUS AND METHODS FOR MODIFYING A MODEL OF AN OBJECT TO ENFORCE COMPLIANCE WITH A MANUFACTURING CONSTRAINT

(75) Inventors: Torsten Berger, Watertown, MA (US); Bradley A. Payne, Andover, MA (US); Walter C. Shannon, III, Brookline, MA (US)

(73) Assignee: SensAble Technologies, Inc., Woburn, MA (US)

( * ) Notice: Subject to any disclaimer, the term of this patent is extended or adjusted under 35 U.S.C. 154(b) by 22 days.

(21) Appl. No.: 10/856,699

(22) Filed: May 28, 2004

(65) Prior Publication Data

US 2005/0154481 A1    Jul. 14, 2005

Related U.S. Application Data

(60) Provisional application No. 60/536,068, filed on Jan. 13, 2004.

(51) Int. Cl.
*G06F 19/00* (2006.01)
*G06T 17/00* (2006.01)

(52) U.S. Cl. .................. 700/98; 700/103; 345/419; 345/424

(58) Field of Classification Search ............ 700/98, 700/103; 345/419, 424, 653
See application file for complete search history.

(56) References Cited

U.S. PATENT DOCUMENTS

| | | | |
|---|---|---|---|
| 2,475,484 A | 7/1949 | DeNise | |
| 3,168,203 A | 2/1965 | Gallistel | |
| 3,263,824 A | 8/1966 | Jones et al. | |
| 3,449,008 A | 6/1969 | Colechia | |
| 3,531,868 A | 10/1970 | Stevenson | |
| 3,618,786 A | 11/1971 | Fick | |
| 3,637,092 A | 1/1972 | George et al. | |
| 3,920,972 A | 11/1975 | Corwin et al. | |
| 3,944,798 A | 3/1976 | Eaton | |
| 4,062,455 A | 12/1977 | Flatau | |
| 4,150,803 A | 4/1979 | Fernandez | |
| 4,216,467 A | 8/1980 | Colston | |
| 4,302,138 A | 11/1981 | Zarudiansky | |
| 4,367,532 A | 1/1983 | Crum et al. | |
| 4,420,808 A | 12/1983 | Diamond et al. | |

(Continued)

FOREIGN PATENT DOCUMENTS

EP    0 915 434 A2    5/1999

(Continued)

OTHER PUBLICATIONS

Bourke, Paul, "Triangulate: Efficient Triangulation Alogirthm Suitable for Terrain Modelling or An Algorithm for Interpolating Irregularly-Spaced Data with Applications in Terrain Modelling," http://astronomy.swin.edu.au/~pbourke/terrain/triangulate/, dated Jan. 1989.

(Continued)

*Primary Examiner*—Jayprakash N. Gandhi
(74) *Attorney, Agent, or Firm*—Goodwin Procter LLP

(57) ABSTRACT

The invention provides an apparatus and methods for automatically modifying a computer model of an object to comply with a manufacturing constraint for production of the object. In one embodiment, the invention uses a voxel-based approach to automatically modify an arbitrarily-shaped model at any stage of the design process. For example, a method of the invention automatically modifies a model of a molded object to comply with a draft angle requirement.

48 Claims, 17 Drawing Sheets

U.S. PATENT DOCUMENTS

| | | |
|---|---|---|
| 4,521,685 A | 6/1985 | Rebman |
| 4,604,016 A | 8/1986 | Joyce |
| 4,632,341 A | 12/1986 | Repperger et al. |
| 4,638,798 A | 1/1987 | Shelden et al. |
| 4,653,011 A | 3/1987 | Iwano |
| 4,654,648 A | 3/1987 | Herrington et al. |
| 4,655,673 A | 4/1987 | Hawkes |
| 4,661,032 A | 4/1987 | Arai |
| 4,670,851 A | 6/1987 | Murakami et al. |
| 4,676,002 A | 6/1987 | Slocum |
| 4,680,519 A | 7/1987 | Chand et al. |
| 4,686,522 A | 8/1987 | Hernandez et al. |
| 4,703,443 A | 10/1987 | Moriyasu |
| 4,729,098 A | 3/1988 | Cline et al. |
| 4,769,763 A | 9/1988 | Trieb et al. |
| 4,791,934 A | 12/1988 | Brunnett |
| 4,795,296 A | 1/1989 | Jau |
| 4,800,721 A | 1/1989 | Cemenska et al. |
| 4,819,195 A | 4/1989 | Bell et al. |
| 4,823,634 A | 4/1989 | Culver |
| 4,837,734 A | 6/1989 | Ichikawa et al. |
| 4,839,838 A | 6/1989 | LaBiche et al. |
| 4,853,874 A | 8/1989 | Iwamoto et al. |
| 4,888,538 A | 12/1989 | Dimitrov et al. |
| 4,893,981 A | 1/1990 | Yoshinada et al. |
| 4,907,970 A | 3/1990 | Meenen, Jr. |
| 4,907,973 A | 3/1990 | Hon |
| 4,942,538 A | 7/1990 | Yuan et al. |
| 4,945,305 A | 7/1990 | Blood |
| 4,945,501 A | 7/1990 | Bell et al. |
| 4,961,138 A | 10/1990 | Gorniak |
| 4,973,111 A * | 11/1990 | Haacke et al. .............. 324/309 |
| 4,973,215 A | 11/1990 | Karlen et al. |
| 4,982,504 A | 1/1991 | Söderberg et al. |
| 4,988,981 A | 1/1991 | Zimmerman et al. |
| 5,004,391 A | 4/1991 | Burdea |
| 5,007,300 A | 4/1991 | Siva |
| 5,018,922 A | 5/1991 | Yoshinada et al. |
| 5,019,761 A | 5/1991 | Kraft |
| 5,038,089 A | 8/1991 | Szakaly |
| 5,040,306 A | 8/1991 | McMurtry et al. |
| 5,044,956 A | 9/1991 | Behensky et al. |
| 5,053,975 A | 10/1991 | Tsuchihashi et al. |
| 5,072,361 A | 12/1991 | Davis et al. |
| 5,088,046 A | 2/1992 | McMurtry |
| 5,088,055 A | 2/1992 | Oyama |
| 5,103,404 A | 4/1992 | McIntosh |
| 5,105,367 A | 4/1992 | Tsuchihashi et al. |
| 5,116,051 A | 5/1992 | Moncrief et al. |
| 5,116,180 A | 5/1992 | Fung et al. |
| 5,130,632 A | 7/1992 | Ezawa et al. |
| 5,131,844 A | 7/1992 | Marinaccio et al. |
| 5,142,931 A | 9/1992 | Menahem |
| 5,143,505 A | 9/1992 | Burdea et al. |
| 5,184,319 A | 2/1993 | Kramer |
| 5,185,561 A | 2/1993 | Good et al. |
| 5,189,806 A | 3/1993 | McMurtry et al. |
| 5,193,963 A | 3/1993 | McAffee et al. |
| 5,204,824 A | 4/1993 | Fujimaki |
| 5,220,260 A | 6/1993 | Schuler |
| 5,223,776 A | 6/1993 | Radke et al. |
| 5,237,647 A | 8/1993 | Roberts et al. |
| 5,239,246 A | 8/1993 | Kim |
| 5,255,211 A | 10/1993 | Redmond |
| 5,264,768 A | 11/1993 | Gregory et al. |
| 5,266,875 A | 11/1993 | Slotine et al. |
| 5,333,257 A | 7/1994 | Merrill et al. |
| 5,354,162 A | 10/1994 | Burdea et al. |
| 5,382,885 A | 1/1995 | Salcudean et al. |
| 5,389,865 A | 2/1995 | Jacobus et al. |
| 5,396,265 A | 3/1995 | Ulrich et al. |
| 5,414,337 A | 5/1995 | Schuler |
| 5,429,140 A | 7/1995 | Burdea et al. |
| 5,438,529 A | 8/1995 | Rosenberg et al. |
| 5,446,834 A | 8/1995 | Deering |
| 5,459,382 A | 10/1995 | Jacobus et al. |
| 5,482,051 A | 1/1996 | Reddy et al. |
| 5,489,830 A | 2/1996 | Fernandez |
| 5,497,452 A | 3/1996 | Shimizu et al. |
| 5,506,785 A * | 4/1996 | Blank et al. .................. 700/98 |
| 5,515,078 A | 5/1996 | Greschler et al. |
| 5,555,894 A | 9/1996 | Doyama et al. |
| 5,559,412 A | 9/1996 | Schuler |
| 5,576,727 A | 11/1996 | Rosenberg et al. |
| 5,587,937 A | 12/1996 | Massie et al. |
| 5,589,854 A | 12/1996 | Tsai |
| D377,932 S | 2/1997 | Schena et al. |
| 5,623,582 A | 4/1997 | Rosenberg |
| 5,623,642 A | 4/1997 | Katz et al. |
| 5,625,576 A | 4/1997 | Massie et al. |
| 5,629,594 A | 5/1997 | Jacobus et al. |
| 5,642,469 A | 6/1997 | Hannaford et al. |
| 5,659,493 A | 8/1997 | Kiridena et al. |
| 5,666,138 A | 9/1997 | Culver |
| 5,691,898 A | 11/1997 | Rosenberg et al. |
| 5,694,013 A | 12/1997 | Stewart et al. |
| 5,701,140 A | 12/1997 | Rosenberg et al. |
| 5,721,566 A | 2/1998 | Rosenberg et al. |
| 5,724,264 A | 3/1998 | Rosenberg et al. |
| 5,731,804 A | 3/1998 | Rosenberg |
| 5,734,373 A | 3/1998 | Rosenberg et al. |
| 5,737,505 A | 4/1998 | Shaw et al. |
| 5,739,811 A | 4/1998 | Rosenberg et al. |
| 5,742,278 A | 4/1998 | Chen et al. |
| 5,751,289 A | 5/1998 | Myers |
| 5,754,023 A | 5/1998 | Roston et al. |
| 5,767,839 A | 6/1998 | Rosenberg |
| 5,769,640 A | 6/1998 | Jacobus et al. |
| 5,774,130 A | 6/1998 | Horikawa et al. |
| 5,784,542 A | 7/1998 | Ohm et al. |
| 5,790,108 A | 8/1998 | Salcudean et al. |
| 5,798,752 A | 8/1998 | Buxton et al. |
| 5,800,177 A | 9/1998 | Gillio |
| 5,800,178 A | 9/1998 | Gillio |
| 5,800,179 A | 9/1998 | Bailey |
| 5,802,353 A | 9/1998 | Avila et al. |
| 5,803,738 A | 9/1998 | Latham |
| 5,805,140 A | 9/1998 | Rosenberg et al. |
| 5,821,920 A | 10/1998 | Rosenberg et al. |
| 5,825,308 A | 10/1998 | Rosenberg |
| 5,828,197 A | 10/1998 | Martin et al. |
| 5,831,408 A | 11/1998 | Jacobus et al. |
| 5,844,392 A | 12/1998 | Peurach et al. |
| 5,847,956 A | 12/1998 | Bronfeld et al. |
| 5,859,934 A | 1/1999 | Green |
| 5,872,438 A | 2/1999 | Roston |
| 5,873,106 A | 2/1999 | Joseph |
| 5,880,714 A | 3/1999 | Rosenberg et al. |
| 5,881,178 A | 3/1999 | Tsykalov et al. ........... 382/260 |
| 5,882,206 A | 3/1999 | Gillio |
| 5,889,670 A | 3/1999 | Schuler et al. |
| 5,898,599 A | 4/1999 | Massie et al. |
| 5,903,270 A | 5/1999 | Gentry et al. |
| 5,903,886 A | 5/1999 | Heimlich et al. |
| 5,907,487 A | 5/1999 | Rosenberg et al. |
| 5,913,727 A | 6/1999 | Ahdoot |
| 5,929,607 A | 7/1999 | Rosenberg et al. |
| 5,929,846 A | 7/1999 | Rosenberg et al. |
| 5,956,484 A | 9/1999 | Rosenberg et al. |
| 5,963,212 A | 10/1999 | Bakalash |
| 5,973,678 A | 10/1999 | Stewart et al. |
| 5,988,862 A | 11/1999 | Kacyra et al. |
| 6,040,840 A | 3/2000 | Koshiba et al. ............. 345/441 |
| 6,061,004 A | 5/2000 | Rosenberg .................. 341/20 |

| | | | |
|---|---|---|---|
| 6,064,394 | A | 5/2000 | Morrison |
| 6,084,587 | A | 7/2000 | Tarr et al. |
| 6,111,577 | A | 8/2000 | Zilles et al. |
| 6,131,097 | A | 10/2000 | Peurach et al. |
| 6,191,796 | B1 | 2/2001 | Tarr |
| 6,211,848 | B1 | 4/2001 | Plesniak et al. |
| 6,219,032 | B1 | 4/2001 | Rosenberg et al. ......... 345/157 |
| 6,226,003 | B1 | 5/2001 | Akeley |
| 6,308,144 | B1 | 10/2001 | Bronfeld et al. |
| 6,337,678 | B1 | 1/2002 | Fish |
| 6,342,880 | B1 | 1/2002 | Rosenberg et al. |
| 6,369,834 | B1 | 4/2002 | Zilles et al. |
| 6,384,822 | B1 | 5/2002 | Bilodeau et al. |
| 6,405,158 | B1 | 6/2002 | Massie et al. |
| 6,417,638 | B1 | 7/2002 | Guy et al. |
| 6,421,048 | B1 | 7/2002 | Shih et al. |
| 6,552,722 | B1 | 4/2003 | Shih et al. |
| 6,608,631 | B1 | 8/2003 | Milliron |
| 6,671,651 | B1 | 12/2003 | Goodwin et al. |
| 6,707,458 | B1 | 3/2004 | Leather et al. .............. 345/582 |
| 2002/0075283 | A1 | 6/2002 | Payne |
| 2002/0089500 | A1 | 7/2002 | Jennings et al. |
| 2002/0154132 | A1 | 10/2002 | Dumesny et al. ........... 345/582 |
| 2002/0158842 | A1 | 10/2002 | Guy et al. |
| 2003/0117411 | A1 | 6/2003 | Fujiwara et al. |
| 2003/0128208 | A1 | 7/2003 | Shih et al. |
| 2003/0191554 | A1 | 10/2003 | Russell et al. |
| 2005/0060130 | A1* | 3/2005 | Shapiro et al. ................. 703/2 |
| 2005/0062738 | A1* | 3/2005 | Handley et al. ............ 345/419 |
| 2005/0168460 | A1* | 8/2005 | Razdan et al. .............. 345/419 |

FOREIGN PATENT DOCUMENTS

| | | |
|---|---|---|
| GB | 2389764 | 12/2003 |
| GB | 2410351 | 7/2005 |
| WO | WO 95/02801 | 1/1995 |
| WO | WO 96/16397 | 5/1996 |
| WO | WO 96/22591 | 7/1996 |
| WO | WO 96/42078 | 12/1996 |
| WO | WO 97/06410 | 2/1997 |
| WO | WO 97/12337 | 4/1997 |
| WO | WO 97/12357 | 4/1997 |
| WO | WO 97/19440 | 5/1997 |
| WO | WO 97/21160 | 6/1997 |
| WO | WO 97/44775 | 11/1997 |
| WO | WO 98/06024 | 2/1998 |
| WO | WO 98/26342 | 6/1998 |
| WO | WO 98/30951 | 7/1998 |
| WO | WO 98/58308 | 12/1998 |
| WO | WO 98/58323 | 12/1998 |
| WO | WO 99/10872 | 3/1999 |

OTHER PUBLICATIONS

"CAD BASICS 2: Geometric Primitives," http://caad.arch.ethz.ch/teaching/nds/ws98/computing/cad/cad2.html, printed Jul. 28, 2003.
Capvidia.BE, "FaceWorks 2005," http://www.capvidia.be/index.php?id=23&docinput%5Bdesign%5D=Printable, printed Apr. 2, 2006.
Capvidia.BE, "FaceWorks 2.0 tutorial," [best available copy], http://www.capvidia.be/products/swadd/fw/fw_tutorial.htm, printed Jul. 28, 2003.
"Computer Graphics Algorithms: Frequently Asked Questions, Section 5—3D Computations," http://www.exaflop.org/docs/cgafaq/cga5.html, printed May 14, 2004.
Gueziec, Andre "Efficient Compression of Non-manifold Polygonal Meshes," Multigen-Paradign, Inc., Thursday, Nov. 4, 1999, UCDavis Colloquium, http://www.cs.ucdavis.edu/department/colloquia/99-00/gueziec.html, printed Jul. 28, 2003.
"The Maya 4.5 Handbook (with CD-ROM) (Graphics Series)," Amazon.com citation. pp. 1-7. http://www.amazon.com/.
"Mold Advisor: Mold Design Using 3D Vision Mold Adviser," Tesis, 2pp., available at www.acuityinc.com/pdfs/Mold%20Advisor.pdf, undated.
Watkins, Adam. "The Maya 4.5 Handbook." Charles River Media, Inc. (c) 2003. ISBN 1-58450-234-7, pp. 332-336.
"Moldplus," MACDAC Engineering, http://www.macdac.com/moldplus/moldplus.htm, 4 pgs.
Altmann, "About Nonuniform Rational B-Splines—NURBS," http://www.cs.wpi.edu/~matt/courses/cs563/talks/nurbs.html., printed Jul. 29, 2003, 6 pgs.
Apple Computer Inc., "OpenGL for Mac OS: Glossary," http://www.developer.apple.com/documentation/GraphicsImaging/Conceptual/OpenGL/glossary . . . , printed Aug. 2002, 3pgs.
*Avid Technology*, "Curves," printed Nov. 6, 2003, http://www.iro.umontreal.ca/~roys/softimage/html/model/curves.html, chapter 10, 19 pgs.
*Avid Technology*, "Fundamentals of NURBS Modeling," printed Nov. 6, 2003, http://www.iro.umontreal.ca/~roys/softimage/html/model/nurbs_basics.html, chapter 9, 7 pgs.
*Avid Technology*, "Surfaces," printed Nov. 6, 2003, http://www.iro.umontreal.ca/~roys/softimage/html/model/surfs.html, chapter 11, 22 pgs.
Adachi, "Touch and Trace on the Free-Form Surface of Virtual Object," Proceedings of IEEE Virtual Reality Annual International Symposium, Sep. 18-22, 1993, Seattle WA, pp. 162-168.
Agrawala et al., "3D Painting on Scanned Surfaces", Stanford University, 1995, pp. 145-150.
Barr, "Global and Local Deformations of Solid Primitives"; Computer Graphics; vol. 18, No. 3, pp. 21-30 (Jul., 1984).
Bentley, "Rendering Cubic Bezier Patches," Worcester Polytechnic Institute, printed Nov. 17, 2003, http://www.cs.wpi.edu/~matt/courses/cs563/talks/surface/bez_surf.html, 10 pgs.
Birn, "How to Model A Hairy Hippo Nose in Softimage 3D," http://ww.3drender.com/ibim/hippo/hairyhipponose.html, printed Jul. 29, 2003, 3 pgs.
Birn, "Mental Ray Resources," http://www.3drender.com/ref/max.htm., printed Jul. 29, 2003, 4 pgs.
Birn, "NurbsPatchHead.igs," http://www.turbosquid.com/HTMLClient/FullPreview/ . . . printed Jul. 29, 2003, 1 pg.
Birn, "Softimage's Surface Continuity Manager," http://www.3drender.com/nef/index.html, printed Jul. 29, 2003, 2 pgs.
Birn, "Tutorial: NURBS Head Modeling," printed Jul. 29, 2003, http://www.3drender.com/jbirn/ea/HeadModel.html, 5 pgs.
Blinn, "Simulation of Wrinkled Surfaces," Computer Graphics, vol. 12-3, Aug. 1978, pp. 286-292.
Brooks et al., "Project GROPE—Haptic Displays for Scientific Visualization," Computer Graphics, vol. 24, No. 4, Aug. 1990, pp. 177-185.
Creating A Lathed NURBS Surface, http://www.maxhelp.com/content/tutorials/nurbs/nurbs.htm, printed Jul. 29, 2003, 3 pgs.
CSB/SJU IT Services, "Color Depth and Color Spaces," http://www.csbsju.edu/itsevices/teaching/c_space/colors.htm, Sep. 12, 2003, 3 pgs.
Decaudin, "Geometric Deformation by Merging a 3D-Object with a Simple Shape," Graphics Interface '96 Proceedings (Toronto, Canada), 6 pgs. (May 21-24, 1996).
Digital Photography and Imaging Glossary, Aug. 2000.
Dworkin et al., "A New Model for Efficient Dynamic," Fourth Eurographics Animation and Simulation Workshop Proceedings Eurographics Technical Report Series, ISSN 1017-4656, Sep. 4-5, 1993, pp. 135-147.
Elhajj et al., "Supermedia-Enhanced Internet-Based Telerobotics," Proceedings of the IEEE, vol. 91, No. 3, pp. 396-421 (Mar. 2003).
Farin, "NURBS," printed Nov. 17, 2003, www.eros.cagd.eas.asu.edu/~farin/rbook/toc.html, 2 pgs.
Fisher et al., "Pixel Values," http://www/dai.ed.ac.uk/HIPR2/value.htm (1 pg).
Foskey et al, "*ArtNova*: Touch-Enabled 3D Model Design," Proceedings of IEEE Virtual Reality 2002, Mar. 24-28, 2002, Orlando, Florida pp. 119-126.
Fuentes et al., "The Virtual Tool Approach to Dextrous Telemanipulation," Proceedings of the 1996 IEEE International Conference on Robotics and Automation (Minneapolis, MN), pp. 1700-1705 (Apr. 1996).

Galyean, "Sculpting: An Interactive Volumetric Modeling Technique," Computer Graphics (SIGGRAPH '91 Las Vegas), vol. 25, No. 4, pp. 267-274 (Jul. 1991).

Geomagic, "geomagicshape," http://www.geomagic.com/products/shape/, printed Nov. 26, 2003.

Gu et al., "Global Conformal Surface Parameterization," Eurographics Symposium on Geometry Processing (2003), 12 pgs.

Hashimoto et al., "Dynamic Force Simulator for Force Feedback Human-Machine Interaction", IEEE, Sep. 1993, pp. 209-215.

Hirata et al., "3-Dimensional Interface Device for Virtual Work Space," Proceedings of the 1992 IEEE, Jul. 7-10, 1992, pp. 889-896.

Hirota et al., "Development of Surface Display," Proceedings of the Virtual Reality Annual International Symposium (Seattle), pp. 256-262 (Sep. 18-23, 1993).

Hirota et al., "Providing Force Feedback in Virtual Environments", IEEE, Sep. 1995, pp. 22-30.

"How to Create Complex Meshes With NURBS," http://www.geocities.com/SiliconValley/Lakes/2057/nurbs.html., printed Jul. 29, 2003, 4 pgs.

Immersion Corporation, "Laparoscopic Impulse Engine□: A New Force Feedback Surgical Simulation Tool", Immersion Corporation, 1995. http://www.immerse.com/wwwpages/lapIEpg.htm.

Immersion Corporation, "The Impulse Engine□", 1 page, Immersion Corporation, 1996.

Immersion Corporation, "Virtual Laparoscopic Interface", Immersion Corporation, 1995, 1 pg.

Ishii et al., "A 3D Interface Device with Force Feedback: A Virtual Work Space for Pick-and-Place Tasks", IEEE, Sep. 1993, pp. 331-335.

Iwata, "Artificial Reality with Force-feedback: Development of Desktop Virtual Space with Compact Master Manipulator," Computer Graphics (SIGGRAPH '90 Dallas), vol. 24, No. 4, pp. 165-170 (Aug. 1990).

Jay Arraich's Photoshop Tips, "7 Quick Mask," http://www.arraich.com/ref/aatool-quick_mask6.htm, printed Sep. 12, 2003, 3 pgs.

Kelley et al. "MagicMouse: Tactile and Kinesthetic Feedback in the Human-Computer Interface Using an Electromagnetically Actuated Input/Output Device," Department of Electrical Engineering, University of British Columbia, Vancouver, BC, V6T 1Z4, Canada, Oct. 19, 1993, pp. 1-27.

Komerska et al., "Haptic Interface for Center-of-Workspace Interaction: Demonstration Paper," *Haptics Interfaces for Virtual Environments and Teleoperator Systems* (2002). pp. 352-353.

Kotoku et al., "A Force Display Algorithm for virtual Environments," SICE, pp. 347-355, 1992.

Luo et al., "Networked Intelligent Robots Through the Internet: Issues and Opportunities," Proceedings of the IEEE, vol. 91, No. 3, pp. 371-382 (Mar. 2003).

MACADAC Engineering, Inc., "The power of 3D photography: Turning physical objects into digital assets," http://www.macdac.com/raindrop/studio.htm, printed Oct. 3, 2003, 4 pgs.

Marcus et al., "EXOS Research on Master Controllers for Robotic Devices," Fifth Annual Workshop on Space Operations Applications and Research (SOAR '91) pp. 238-245, Jul. 1991.

Massie, "Design of a Three Degree of Freedom Force-Reflecting Haptic Interface", Massachusetts Institute of Technology; Bachelor of Science in Electrical Science and Engineering Thesis, May 1993, pp. 1-38.

Massie, "Initial Haptic Explorations with the Phantom: Virtual Touch Through Point Interaction", Massachusetts Institute of Technology Master of Science Thesis, Feb. 1996, pp. 1-49. (not admitted as prior art).

Math Forum, "What is a Tessellation?", http://mathforum.org/sum95/suzanne/whattess.html, printed Jul. 29, 2003, 4pgs.

Math World, "Conformal Mapping," http://mathworld.wolfram.com/ConformalMapping.html, printed Nov. 11, 2003.

McAffee et al, "Teleoperator Subsystem/Telerobot Demonstrator," Force Reflecting Hand Controller Equipment Manual, Jet Propulsion Laboratory, Jan. 1988.

Miller et al., "The Design of 3D Haptic Widgets," Proceedings of the 1999 Symposium on Interactive 3D Graphics Conference Proceedings, (1999) pp. 1-6.

Millman et al., "A System for the Implementation and Kinesthetic Display of Virtual Environments," Telemanipulator Technology, Proceedings of 1992 SPIE, vol. 1833, pp. 49-56.

Minsky et al., "Feeling and Seeing: Issues in Force Display," Computer Graphics, vol. 24, No. 2, Mar. 1990, pp. 235-270.

Minsky, "Computational Haptics: The Sandpaper System for Synthesizing Texture for a Force-Feedback Display," Massachusetts Institute of Technology Ph.D. Thesis, Jun, 1995, pp. 1-217.

Models and Modeling, http://www.3drender.com/models/index.htm, printed Jul. 29, 2003, 1 pg.

Morgenbesser, "Force Shading for Shape Perception in Haptic Virtual Environments", Massachusetts Institute of Technology Master of Engineering Thesis, Sep., 1995, pp. 1-77.

Nagel, "A Closer Look: Photoshop's New Paint Engine, p. 2 of 3," Mar. 7, 2002, http://www.creativemac.com/2002/03_mar/features/ps7dynamics1.htm (6 pgs.).

Nicholson, "Photoshop," http://iit.bloomu.edu/vthc/Photoshop/Basics/layers.htm, printed Sep. 12, 2003.

"Nurbs Curves & Surfaces," http://www.ocnus.com/NURBS/, printed Jul. 29, 2003, 2 pgs.

"NURBS Models," http://www.3drender.com/models/models.htm, Jul. 29, 2003, 1 pg.

"NURBS-Non-Uniform Rational B-Splines," http://www.aria.uklinux.net/nurbs.php3, printed Jul. 29, 2003, 4 pgs.

Oboe, "Force-Reflecting Teleoperation Over the Internet: The JBIT Project," Proceedings of the IEEE, vol. 91, No. 3, pp. 449-462 (Mar. 2003).

Payne et al., "Distance Field Manipulation of Surface Models," IEEE Computer Graphics & Applications, pp. 65-71 (Jan. 1992).

Photoshop Techniques, "How to Use Postscript Art as a Stencil in Photoshop," Swanson Technical Support, 1994.

"Revival of the Virtual Lathe," University of Michigan Virtual Reality Laboratory, http://www-vrl.umich.edu/sel_prj/lathe/, (Dec. 20, 2002).

Rogers, "An Introduction to NURBS," *Morgan Kaufmann Publishers*, (2000), pp. 1-4.

Roxen Platform, "Graphics tags," http://docs.roxen.com/roxen/1.3/creator/graphics/, printed Sep. 12, 2003, 2 pgs.

Safaric et al., "Control of Robot Arm with Virtual Environment via the Internet," Proceedings of the IEEE, vol. 91, No. 3, pp. 422-429 (Mar. 2003).

Salisbury et al., "Haptic Rendering: Programming Touch Interaction with Virtual Objects," Presented and disseminated at the 1995 Symposium on Interactive 3D Graphics held Apr. 9-12, 1995 in Monterey, CA, sponsored by the Association for Computing Machinery (ACM) and published by the ACM in Proceedings: 1995 Symposium on Interactive 3D Graphics, Monterey, California, Apr. 9-12, 1995, pp. 123-130.

SensAble Technologies, Inc., "Phantom Haptic Interface," 1996, Cambridge, MA (6 pgs).

Sensable Technologies, "Feature Overview," Nov. 25, 2003 printout, http://www.sensable.com/products3ddesign/freeform/overview.asp, 5 pgs.

Sensable Technologies, "Feature Overview: Emboss with Wrapped Image," Nov. 25, 2003 printout, http://www.sensable.com/products/3ddesign/freeform/emboss_with_wrap.asp, 1 pg.

SensAble Technologies, "Leap from 2D to 3D," undated, 7 pgs.

Sharman, "The Marching Cubes Algorithm," http://www.exaflop.org/docs/marchcubes/ind.html (6 pgs.).

Snow et al., "Compact Force-Reflecting Hand Controller," NASA Tech Brief, vol. 15, No. 4 from jet Propulsion Laboratory Report NPO-17851-7348, Apr. 1991, pp. i, 1-3, 1a-11a, 14a, 15a.

Sorkine, et al, "Bounded-distortion Piecewise Mesh Parameterization," Proceedings of the Conference on Visulization 2002, Boston, Massachusetts, pp. 355-362.

Swarup, "Haptic Interaction with Deformable Objects Using Real-Time Dynamic Simulation", Massachusetts Institute of Technology, Sep. 1995, pp. 1-83.

Tan et al., "Virtual Environments for Internet-Based Robots—I: Modeling a Dynamic Environment," Proceedings of the IEEE, vol. 91, No. 3, pp. 383-388 (Mar. 2003).

Tan et al., "Virtual Environments for Internet-Based Robots—II: Path Planning," Proceedings of the IEEE, vol. 91, No. 3, pp. 389-395 (Mar. 2003).

"Tensor product spline surfaces," http://www.ibiblio.org/e-notes/Splines/Inter.htm, Aug. 24, 2001.

Terzopoulos et al.; "Elastically Deformable Models"; Computer Graphics, vol. 21, No. 4, pp. 205-214 (Jul., 1987).

"Texture Mapping," http://www.geocities.com/SiliconValley/2151/tmap.html, printed Nov. 26, 2003, 22 pgs., Feldman, the Win95 Game Programmer's Encyclopedia.

"3D Animation Workshop: Lesson 39—Softimage—NURBS Blending," http://www.webreference.com/3d/lesson39/, Apr. 28, 1998.

"3D Animation Workshop: Lesson 64—Introducing MAX NURBS," http://www.webreference.com/3d/lesson64/, Apr. 14, 1999.

"3D Animation Workshop: Lesson 65—Basic MAX NURBS Surfaces," http://www.webreference.com/3d/lesson65/, Apr. 28, 1998.

"3D Animation Workshop: Lesson 66—From MAX NURBS to Polygons," http://www.webreference.com/3d/lesson66/, May 12, 1999.

"3D Animation Workshop: Lesson 67—Basic MAX NURBS Patches," http://www.webreference.com/3d/lesson67/, May 12, 1999.

"3D Animation Workshop: Lesson 68—Trimming MAX NURBS," http://www.webreference.com/3d/lesson68/, Jun. 8, 1999.

"3D Animation Workshop: Lesson 69—MAX NURBS—The Piston Project," http://www.webreference.com/3d/lesson69/, Jul. 21, 1999.

"3D Animation Workshop: Lesson 72—A Challenging Model," http://www.webreference.com/3d/lesson72/, Aug. 2, 1999.

"3D Animation Workshop: 3D Modeling Tutorials, Lessons, and Software Reviews," http://www.webreference.com/3d/, May 8, 2001, 6 pgs.

Tyson, Howstuffworks, "How AGP Works," http://computer.howstuffworks.com/agp.htm/printable, printed Jul. 15, 2003.

Wang et al., "Volume Sculpting", 1995 Symposium on Interactive 3D Graphics, Monterey, California, pp. 151-156.

University of North Carolina at Chapel Hill, "Touch-Enabled 3D Model Design," Department of Computer Science, Feb. 2002.

Yoshikawa et al., "Construction of Virtual World Using Dynamics Modules and Interaction Modules," Proceedings of the 1996 IEEE International Conference on Robotics and Automation (Minneapolis, MN), pp. 2358-2364 (Apr. 1996).

Zilles et al., "A Constraint-Based God-object Method for Haptic Display," published by IEEE Computer Society Press, Los Alamitos, California, in Proceedings of the 1995 IEEE/RSJ International Conference on Intelligent Robots and Systems—Human Robot Interaction and Cooperative Robots, held Aug. 5-9, 1995 in Pittsburgh, Pennsylvania, 1995, pp. 146-151.

Zilles, "Haptic Rendering with the Toolhandle Haptic Interface," Massachusetts Institute of Technology Master of Science Thesis, May 1995, pp. 1-46.

US 5,903,456, 05/1999, Schena et al. (withdrawn)

* cited by examiner

APPARATUS AND METHODS FOR MODIFYING A MODEL OF AN OBJECT TO ENFORCE COMPLIANCE WITH A MANUFACTURING CONSTRAINT

PRIOR APPLICATIONS

This application claims the benefit of U.S. Provisional Patent Application No. 60/536,068, filed on Jan. 13, 2004, the entirety of which is incorporated by reference herein.

FIELD OF THE INVENTION

The invention generally relates to a tool for computer-aided design of manufactured objects. More particularly, in certain embodiments, the invention relates to an apparatus and methods for automatically enforcing draft angle in a voxel-based model of a molded object.

BACKGROUND OF THE INVENTION

It is important to account for manufacturing constraints in the design of a manufactured object. Traditionally, a designer of an object must anticipate manufacturing problems and must design the object keeping in mind the relevant manufacturing constraints.

For example, it is important in the design of an injection-molded object to consider whether the shape of the object provides sufficient "draft" to allow it to be properly extracted from a mold. An improperly designed object may get stuck in the mold and not extract properly. The shape of the molded object must be designed in a way that eliminates overhangs and undercuts and provides sufficient draft to allow the object to slide out of the mold. More specifically, the molded object may be required to have sufficient draft angle relative to: (1) a parting curve; and (2) a parting direction, where the parting curve indicates how the mold halves come together and the parting direction indicates the direction along which the mold halves are pulled apart during extraction of the object from the mold.

It is often difficult to change a model of an object to enforce a manufacturing constraint in the late stages of design. For example, it is often difficult to modify a boundary representation (BREP) model of an object to correct for inadequate draft. The difficulty lies with topology limitations of such models. If a BREP model needs to be modified in the late stages of design, only a very limited set of simple shape modifications may be made. Satisfactory modification of the model may be impossible if the model was not constructed carefully, for example, by using "draft-friendly" primitives (elementary geometric elements) in troublesome regions. Moreover, use of draft-friendly primitives may be aesthetically unsatisfactory or otherwise unacceptable for certain applications.

Furthermore, changing a design to comply with a manufacturing constraint generally requires expert knowledge about the manufacturing process—knowledge that the designer may not possess.

Traditional approaches typically require manual shape modifications in a multi-pass, iterative process based largely on expert knowledge. Modification may be made early in the design stage, where the burden is imposed on the designer to anticipate likely manufacturing problems, or during the manufacturing stage, where the cost of changing the design may be prohibitive.

Thus, there is a need for computer-aided design systems that provide tools for automatically modifying an arbitrarily-shaped model of an object to enforce compliance with manufacturing constraints. A technique is needed that allows a designer to correct a model after completion of the initial design, but before final approval and/or before manufacturing of the designed object.

SUMMARY OF THE INVENTION

The invention provides an apparatus and methods for automatically modifying a model of an object to comply with a manufacturing constraint for the production of the object. The invention leverages the unique properties of voxels to automatically add or remove material from an arbitrarily-shaped model of an object at any stage of the design process.

In one embodiment, a model of a three-dimensional object is represented by a three-dimensional grid of voxels, each voxel having an assigned value. The value assigned to a voxel depends on its distance from a surface of the object. Virtual material may be added or subtracted from a model at any location by incrementally increasing or decreasing voxel values. Thus, voxel representation allows automatic, indirect, and incremental modification of the surface of an arbitrarily-shaped model. The invention provides methods of automatically modifying a voxel-based model to comply with a given manufacturing constraint.

Certain computer-aided design (CAD) techniques use models that are not amenable to automatic adjustment. These models require a designer to anticipate which areas of the model will need adjustment later in the design process to satisfy manufacturing constraints. Typically, the designer must choose from a limited set of primitives in the initial design of these areas.

The invention provides a method of automatically modifying a three-dimensional model, regardless of its shape, at any stage of the design process. As a result, the designer is free to explore shape and form without the burden of anticipating manufacturing constraints during the early design stages.

Methods of the invention extend the flexibility of CAD systems by automatically adapting CAD models for compatibility with manufacturing processes. Methods of the invention provide high commercial value to designers of moldable objects and/or products in various markets, including toys, collectibles, athletic wear, and electronic devices, for example. The cost of designing products can be reduced, and manufacturing flexibility enhanced by using these methods.

Thus, in one aspect, the invention is directed to a method for automatically modifying a model of a three-dimensional (3D) object for compliance with a manufacturing constraint, the method including the steps of representing a model of an arbitrarily-shaped 3D object with an array of voxel values; and automatically modifying the array of voxel values according to a manufacturing constraint.

An example of a manufacturing constraint is a minimum draft angle, which is the minimum angle (with respect to a pull direction) that is needed to allow extraction of the modeled object from a mold. Draft angle compliance is an important requirement when manufacturing a molded object. For example, an object that is injection molded may get stuck in the mold unless its shape is designed to eliminate undercuts and overhangs and to provide sufficient draft to allow the object to slide out of the mold. Hence, in one embodiment, the invention provides a method of automatically modifying a model of an object according to a draft angle. The draft angle may be user-provided, or a default value may be used, for example. A specific minimum draft angle may be applied, for example. The draft angle may be enforced relative to a parting curve (also known as a parting line curve) and/or parting direction, where the parting curve indicates the edge of a planar or non-planar surface at the intersection of two mold halves, and the parting direction indicates the direction along which the mold halves are separated from each other during extraction of the object from the mold. Where there is a planar parting curve, the parting direction is generally perpendicular to the plane that contains the parting curve. The parting curve and/or parting direction may be user-provided or automatically determined. For example, the user may select a parting curve and/or parting direction. In another embodiment, one or more parting curves and/or parting directions may be automatically determined and indicated for optional selection by the user.

The manufacturing constraint may include one or more parting curves. Where there are multiple parting curves, for example, a user may indicate two or more curves which are joined to form a loop that indicates the edge of a surface at the intersection of two mold halves. Furthermore, the manufacturing constraint may include two or more loops that indicate the intersection of two mold halves. For example, in the case of a toroidal (donut-shaped) object, the intersection of the two mold halves may form two concentric circles (two loops).

In one embodiment, the parting curve may be arbitrarily complex (non-planar) as long as it is a valid parting curve with respect to a given parting direction. That is, if the parting curve is projected along the parting direction onto a plane that is perpendicular to the parting direction (thereby collapsing the parting curve onto a plane), the resulting projection does not self-intersect.

The invention provides methods that work with an arbitrarily-shaped three-dimensional model, regardless of the sequence of steps that were used to generate the model. Both the model and the parting curve can have arbitrary shape. Thus, it is not necessary to use particular types of primitives to represent a given shape in the model. This provides an advantage, since many primitives cannot be modified to add draft angle at all, while others require careful advance planning to support draft angle modifications. The flexibility of voxels to represent and modify any arbitrary 3D shape allows methods of the invention to operate on arbitrarily-shaped 3D models.

Methods of the invention exploit the properties of voxel-based models. These properties include, for example, the ability to increase or decrease voxel values incrementally and, thus, indirectly modify the surface of a model to respect an imposed draft angle. Models that are not voxel-based but which have similar properties may be used in various embodiments of the invention.

In one embodiment, the manufacturing constraint includes a mask volume that indicates a portion of the model that is to remain unmodified. In this way, for example, a user may indicate a portion of the model that is to remain unchanged during the automatic modification to comply with the manufacturing constraint. This may be done, for example, to override an otherwise automatically-imposed manufacturing constraint in a portion of the model.

A method of the invention includes at least one of the steps of: saving the modified array of voxel values to a data storage medium; displaying the model on a visual display following the automatic modification step; transmitting a copy of the modified array of voxel values over a network; providing a printed representation of the model following the modification step; and creating a physical 3D representation of the model following the modification step.

The use of voxel representation is compatible with and complementary to the haptic rendering of the model. In one embodiment, the method further includes the step of graphically and/or haptically rendering the model, for example, following the automatic modification according to the manufacturing constraint. For example, an embodiment of the invention includes haptically rendering the model of the object as a user edits the model. Haptic rendering allows a user to "feel" the object as he modifies it, enhancing the interactivity of the design process. The haptic rendering process includes determining a force feedback corresponding to a position of a haptic interface device held by the user as the user edits the model. The force is delivered to the user via the haptic interface device. A haptic rendering process is described, for example, in co-owned U.S. Pat. No. 6,552,722, by Shih et al., and co-owned U.S. Pat. No. 6,421,048, by Shih et al., both of which are incorporated herein by reference in their entirety. The haptic interface device may be, for example, the Phantom® haptic interface device manufactured by SensAble Technologies, Inc., of Woburn, Mass., as described in U.S. Pat. No. 6,417,638, issued to Rodomista et al., the entirety of which is incorporated herein by reference. Other descriptions of haptic rendering processes and haptic interface devices include co-owned U.S. Pat. No. 6,084,587, by Aviles et al., and co-owned U.S. Pat. No. 6,191,796, by Tarr, both of which are incorporated herein by reference in their entirety. For example, the haptic interface device is a six degree of freedom force-reflecting tool that includes three powered axes and three free axes, all of which are tracked so that the position of a user connection element in the virtual environment of the model can be determined and a corresponding force applied. The haptic interface device, therefore, can double as a graphical interface device.

In one embodiment, the array of voxel values includes one-byte integers. Furthermore, the array may consist entirely or essentially of one-byte integers. Use of one-byte integers allows for fast processing, which is particularly important where the model is haptically rendered and/or where the number of voxels in the voxel volume is large. Of course, it is not necessary that the voxel values be integers. For example, the voxel values may be floating point values of any precision.

In one embodiment, the method further includes the step of generating a surface mesh corresponding to the modified array of voxel values. This may be used, for example, in the aforementioned graphical rendering of the model. The surface mesh may be generated using a marching cubes algorithm, for example.

Modifying the model to comply with a manufacturing constraint may be initiated by a user command, via button click or other input, for example. The user command may initiate automatic modification of the entirety of the model to comply with a manufacturing constraint (for example, a specified draft angle relative to a parting curve and parting direction). Alternatively, modification of the model may proceed in a stage-wise manner, the modification being directed to various portions of the model, either automatically or via user command.

The modification step may include adding and/or removing virtual material to/from the model. Adding virtual material may include modifying the array of voxel values representing the model to increase the volume encompassed by the model. Removing virtual material may include modifying the array of voxel values representing the model to decrease the volume encompassed by the model. As described above, adding and/or removing material may be performed at any stage of the design process, regardless of the shape of the model.

A user may be given an option of whether to add or to remove material in order to satisfy an imposed manufacturing constraint, such as an imposed draft angle. In some cases in which a user specifies adding material to satisfy an imposed draft angle given a specified parting curve and parting direction, the result creates a discontinuity near the parting curve. Therefore, in one embodiment, the modification step includes both adding virtual material to the model and removing virtual material from the model, where the step of removing virtual material is performed in order to preserve a given parting curve.

In one embodiment, the modifying step includes modifying voxel values corresponding to each of a plurality of slices of the model. The slices may be contiguous, and the slices may be sequentially modified. In one example, a "limit slice" is determined, which serves as a template for removing virtual material from and/or adding virtual material to a given slice of the model. The limit slice is adjusted according to (1) the previously-modified slice, and (2) an offset value, determined, for example, according to an imposed draft angle and slice thickness. The slices are modified in a step-wise manner and are made larger, smaller, or left alone according to the limit slice, which passes through the voxel volume as a template, one slice at a time, in a single pass. Thus, in one embodiment, the modifying step includes determining a limit slice for use as a template in modifying voxel values corresponding to a given slice of the model.

The limit slice preferably includes distance field values that indicate distances to a surface of a model, for example, the surface of a limit volume, wherein the distance field values are related to voxel values. In one embodiment, the limit slice encodes the nearest distance to a planar curve, where that planar curve is defined as the intersection between the surface of a limit volume and the current slice-plane of the limit slice.

In another aspect, the invention provides an apparatus for automatically modifying a model of a 3D object to enforce compliance with a manufacturing constraint, the apparatus including a memory for storing code that defines a set of instructions, and a processor adapted to execute the set of instructions to: represent a model of an arbitrarily-shaped 3D object with an array of voxel values; and modify the array of voxel values according to a manufacturing constraint.

The apparatus may further comprise a graphical user interface device and/or a haptic/graphical user interface device in communication with the processor. The haptic/graphical interface device may be the Phantom® haptic interface device manufactured by SensAble Technologies, Inc., of Woburn, Mass., as described in more detail elsewhere herein.

The apparatus may further comprise at least one of: a data storage medium for storing the modified array of voxel values; a visual display for displaying the modified model; a network for transmitting a copy of the modified array of voxel values; a printer for providing a printed representation of the modified model; and a 3D printer for creating a physical 3D representation of the modified model.

In one embodiment, the processor is adapted to provide a haptic/graphical user interface element ("widget"). The widget enables a user to interactively and intuitively select aspects of a manufacturing constraint and to provide a signal for the automatic modification of the model to begin. In one embodiment, the widget allows a user to specify one or more of a draft angle, a parting curve, and a parting direction. The processor is preferably adapted to provide a graphical representation of the position, scale, and/or orientation of the widget in relation to the model. The processor may also be adapted to provide a haptic representation of the widget, including, for example, hotspots, detents, gravity wells, and/or other haptic cues to facilitate manipulation by the user.

The processor may be adapted to provide the use of a "boreline selection" or "view-apparent" selection method for selecting a hotspot, or other point of the widget and/or for selecting various points or regions of the model. Boreline selection allows selection of a three-dimensional location in a virtual environment based on a two-dimensional correspondence of the location and a cursor or tool location. For example, a user may be able to use a 2D representation of the position of a cursor or tool in 3D object space as viewed on a flat screen, and have the cursor/tool automatically repositioned to a hotspot location in 3D object space without having to search for the hotspot by attempting to move along the "depth" axis, where movement along the depth axis is not easily tracked using the 2D screen representation. In other words, boreline selection collapses depth for the purposes of selection, thereby making entities associated with a position in 3D space easier to find and select. Boreline selection is described in more detail in co-owned U.S. Pat. No. 6,671,651, issued to Goodwin et al., the entirety of which is incorporated herein by reference.

In yet another aspect, the invention is directed to a method for automatically determining a modification of a model of a 3D object for compliance with a specified draft angle, the method including the steps of: representing a model of an arbitrarily-shaped 3D object with an array of voxel values; and automatically determining a modification of the array of voxel values for compliance with a draft angle.

The draft angle may be user-specified. The method may include determining a modification for compliance with the draft angle in relation to a parting curve and/or a parting direction. The method may include determining a modification subject to a mask volume, where the mask volume indicates a portion of the model to remain unmodified. The mask volume may be user-determined. The method may further include the step of modifying the model according to the automatically-determined modification of the array of voxel values.

In one embodiment, the method further includes one or more of the steps of: saving a representation of the modified model to a data storage medium; displaying the modified model on a visual display; transmitting a copy of the modified model over a network; providing a printed representation of the modified model; and creating a physical 3D representation of the modified model.

The method may further include graphically and/or haptically rendering the modified model. The determining step may include determining a modification of the array of voxel values corresponding to each of a plurality of slices of the model. The slices may be contiguous, and the method may determine a modification of each of the slices in a step-wise manner. The determining step may include determining a limit slice for use as a template in determining a modification of voxel values corresponding to a given slice of the model. The limit slice may be modified using an offset value as it is applied in a step-wise manner from slice to slice. The limit slice may include distance field values indicating distances from an edge of a limit volume, wherein the distance field values are related to voxel values. The voxel values may be one-byte integers.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

Figure 1A:
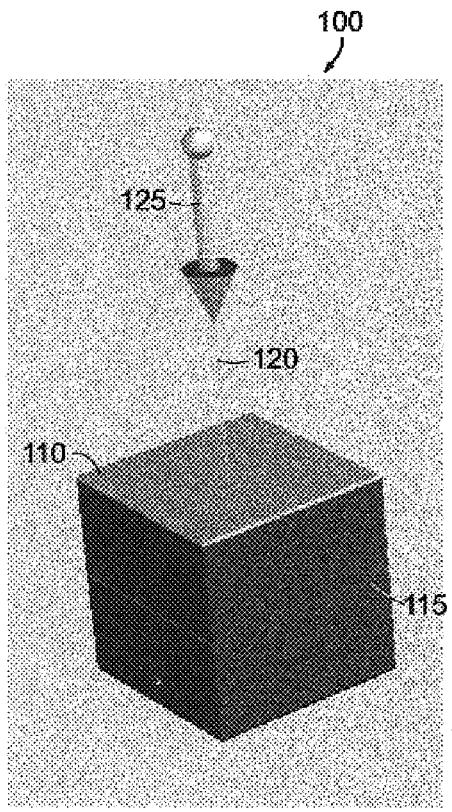
FIG. 1A is a screenshot of a model of a three-dimensional object and a haptic/graphical user interface element for automatically modifying the model to enforce compliance with a minimum draft angle, relative to the parting curve and parting direction shown, according to an illustrative embodiment of the invention.

Throughout the description, where an apparatus is described as having, including, or comprising specific components, or where systems, processes, and methods are described as having, including, or comprising specific steps, it is contemplated that, additionally, there are apparati of the present invention that consist essentially of, or consist of, the recited components, and that there are systems, processes, and methods of the present invention that consist essentially of, or consist of, the recited steps.

It should be understood that the order of steps or order for performing certain actions is immaterial so long as the invention remains operable. Moreover, two or more steps or actions may be conducted simultaneously.

It is an object of the invention to leverage the unique properties of voxels to automatically add and/or remove virtual material from a 3D voxel-based model according to a manufacturing constraint.

An exemplary method of the invention proceeds through the voxel volume in a slice-wise manner, modifying each slice of the voxel volume to correct any deviation from an imposed manufacturing constraint. The voxel volume is generally a three-dimensional grid of voxel density values. For example, the voxel density values may be one-byte integers ranging from 0 to 255, where a given density value, for example 128, indicates a boundary separating the inside of a virtual object from the outside of the virtual object (i.e. the surface of the object).

In one embodiment, the automatic modification method proceeds in a step-wise manner, passing through a voxel volume comprising a 3D model one slice at a time, in a single pass. During the pass through the voxel volume, an array of distance field values is maintained, which represents the cumulative limitations on the "clay" (virtual material) of the current slice implied by the previous slices and the manufacturing constraint. The array of distance field values is referred to herein as the limit slice. The limit slice is used as a template to modify the current voxel slice. The resulting voxel slice may, in turn, impose additional limitations on the remaining slices by modifying the limit slice. To advance from one slice to the next, the distance field array of the limit slice is offset by an appropriate amount. This offset is computed as the amount (i.e., radius) by which a properly drafted cone would grow (or shrink) over the distance separating two slices. There is a direct relationship between the distance field value and the voxel values (or iso-values) stored in the voxel volume, allowing direct transfer of information between the two representations.

When every slice of the voxel volume has been traversed (and possibly modified), the method includes re-triangulating, or otherwise remeshing, the resulting volume to determine the shape of the modified, manufacturable model. For example, the model may be re-triangulated using a marching cubes algorithm, thereby generating triangles (or other polygonal elements) to represent the surface of a given voxel volume. Any other meshing technique may be used. The resulting triangle mesh is manifold by construction (i.e. each edge is shared by two triangles).

Methods of the invention include automatically altering a 3D voxel-based model of arbitrary shape and topology to obey a given manufacturing constraint, such as a minimum draft angle relative to a desired parting curve and parting direction. Methods of the invention leverage the unique properties of voxels to add or remove virtual material to enforce a minimum specified draft angle relative to a given pull direction.

Figure 1B:
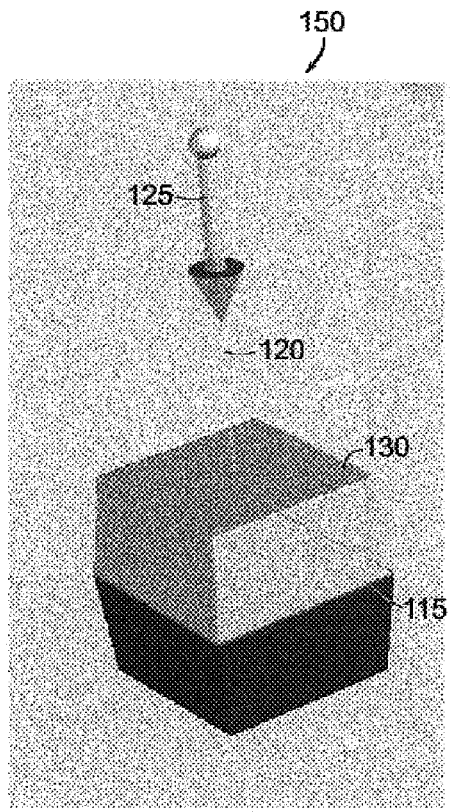
FIG. 1B is a screenshot of the model of FIG. 1A following automatic modification for compliance with the specified minimum draft angle, according to an illustrative embodiment of the invention.

FIGS. 1A and 1B demonstrate an exemplary application of a method for automatically modifying a model to enforce a minimum draft angle. FIG. 1A is a screenshot 100 of a 3D model 110 of an object, as well as a haptic/graphical user interface element (widget) 125 for automatically modifying the model 110 to enforce compliance with a minimum draft angle, relative to the parting curve 115 and parting direction 120 shown. The sides of the model 110 are parallel to the parting direction 120 and would not provide adequate draft for extraction of the object from a mold.

FIG. 1B is a screenshot 150 of the model 130 of FIG. 1A following automatic modification for compliance with a specified minimum draft angle by removal of virtual material from the model, where the draft angle is relative to the indicated parting curve 115 and parting direction 120. The object represented by the model 130 of FIG. 1B can now be extracted from its mold insert, because there is sufficient draft.

Figure 2A:
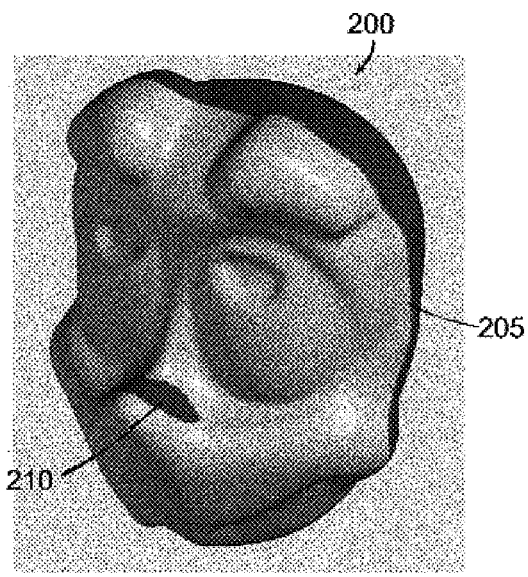
FIG. 2A is a screenshot of a model of a three-dimensional object showing an area of undercut following automatic determination of compliance with a minimum draft angle, relative to the indicated parting curve and parting direction, according to an illustrative embodiment of the invention.

FIGS. 2A to 2D demonstrate a more complex application of the method for automatically modifying a model to enforce a minimum draft angle. FIG. 2A is a screenshot 200 of a model of a three-dimensional object showing an area of undercut 210 following automatic determination of compliance with a minimum draft angle, relative to the indicated parting curve 205 and parting direction, according to an illustrative embodiment of the invention. Screenshot 200 shows the model of the object before it is modified to enforce compliance with a minimum draft angle.

Figure 2B:
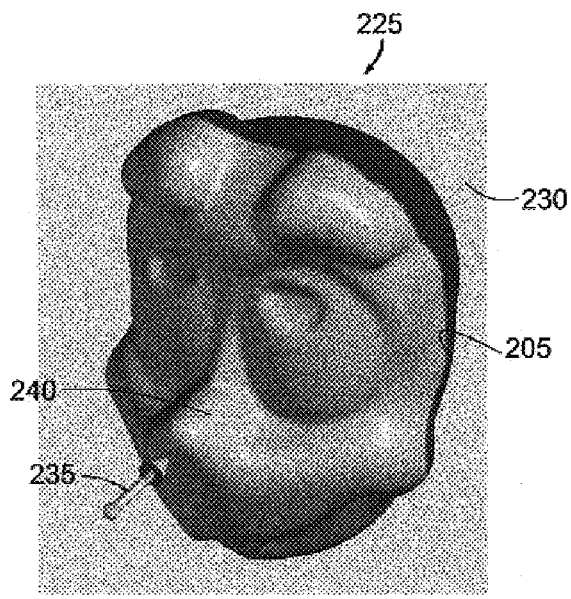
FIG. 2B is a screenshot of the model of FIG. 2A, along with a haptic/graphical user interface element, following automatic modification of the model for compliance with the specified minimum draft angle, thereby eliminating the undercut, according to an illustrative embodiment of the invention.

FIG. 2B is a screenshot 225 of the model of FIG. 2A, along with a haptic/graphical user interface element 235, following automatic modification of the model for compliance with the specified minimum draft angle, thereby eliminating the undercut by adding virtual material 240, according to an illustrative embodiment of the invention. The haptic/graphical user interface (H/GUI) element 235 is positioned to indicate parting direction 230 relative to parting curve 205. The user may manipulate the element 235, which may, itself, be haptically rendered, to select the parting direction 230. The H/GUI element may also be used, for example, to select the parting curve 205, to rotate the model for viewing, and/or to perform other manipulations. Screenshot 225 is illustrative of the result of an "add" operation. Added material 240 has eliminated the undercut 210 identified in FIG. 2A and has brought the model of the object in screenshot 225 into compliance with the minimum draft angle such that the object may be properly removed from its mold insert.

Figure 2C:
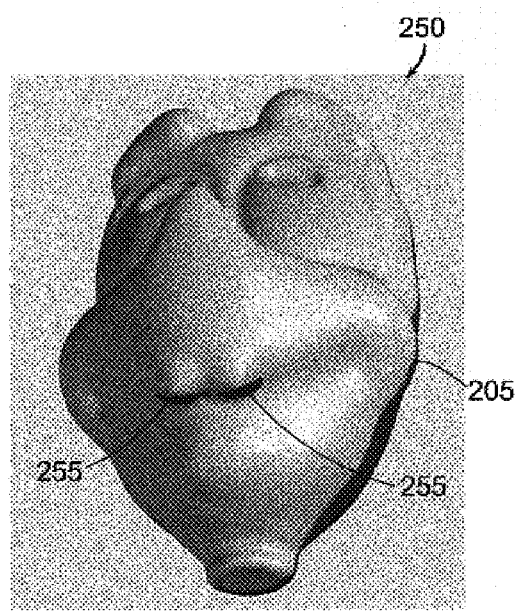
FIG. 2C is a screenshot showing an upward-looking view of the model of FIG. 2A, indicating another area of undercut following automatic determination of compliance with a minimum draft angle, relative to the indicated parting curve and parting direction, according to an illustrative embodiment of the invention.

FIG. 2C is a screenshot 250 showing an upward-looking view of the model of FIG. 2A, indicating another area of undercut 255 following automatic determination of compliance with a minimum draft angle, relative to the indicated parting curve 205 and parting direction 230, according to an illustrative embodiment of the invention. Screenshot 250 shows the model of the object before an add material operation takes place to enforce compliance with a minimum draft angle.

Figure 2D:
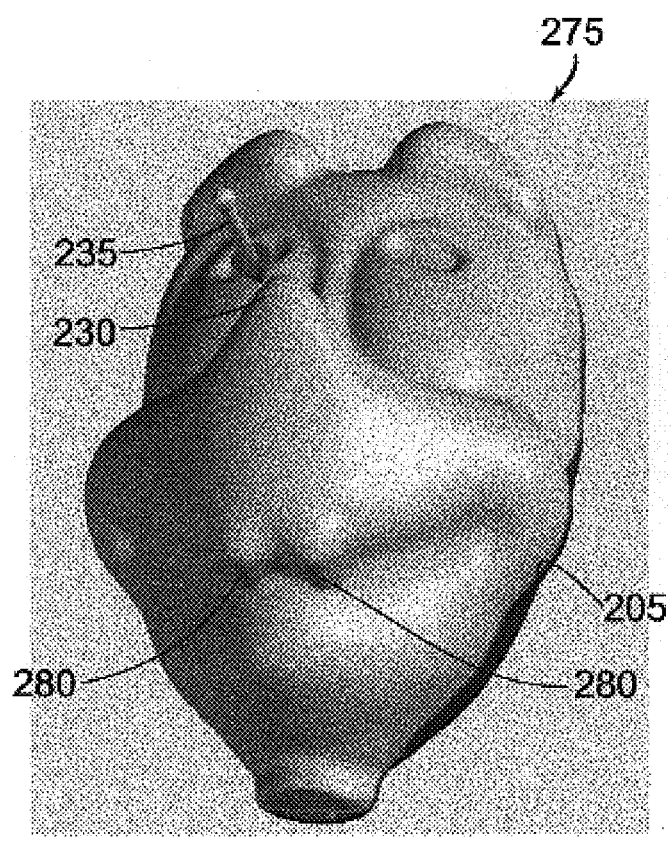
FIG. 2D is a screenshot showing the view of FIG. 2C, following automatic modification of the model for compliance with the specified minimum draft angle, thereby eliminating the undercut, according to an illustrative embodiment of the invention.

FIG. 2D is a screenshot 275 showing the view of FIG. 2C, following automatic modification of the model for compliance with the specified minimum draft. angle, thereby eliminating the undercut, according to an illustrative embodiment of the invention. Screenshot 275 is illustrative of the result of an "add" operation. In this example, the modifications shown in FIGS. 2B and 2D were performed simultaneously.

In one embodiment, methods for enforcing minimum draft angle employ the following inputs, as provided by the user and/or as automatically determined:
  a voxel volume description of the shape or model to be modified; an arbitrary 3D parting direction (a unit vector in 3 dimensions), along which the mold halves will be pulled apart;
  a parametric description of the parting curve (or set of curves) at which the mold halves will part, partitioning the voxel model into an "upper" and a "lower" half;
  a desired draft angle;
  a choice of which half (upper or lower) of the model to modify;
  a choice of how the draft angle is to be enforced, for example, by performing a "cut" procedure to remove overhanging material, by performing an "add" procedure to fill undercuts, or by performing an "add" procedure to fill undercuts while removing material if necessary to preserve the parting curve; and, optionally,
  a user-defined mask volume to restrict areas in which modifications may be made, allowing the user finer control, if desired.

Figure 3:
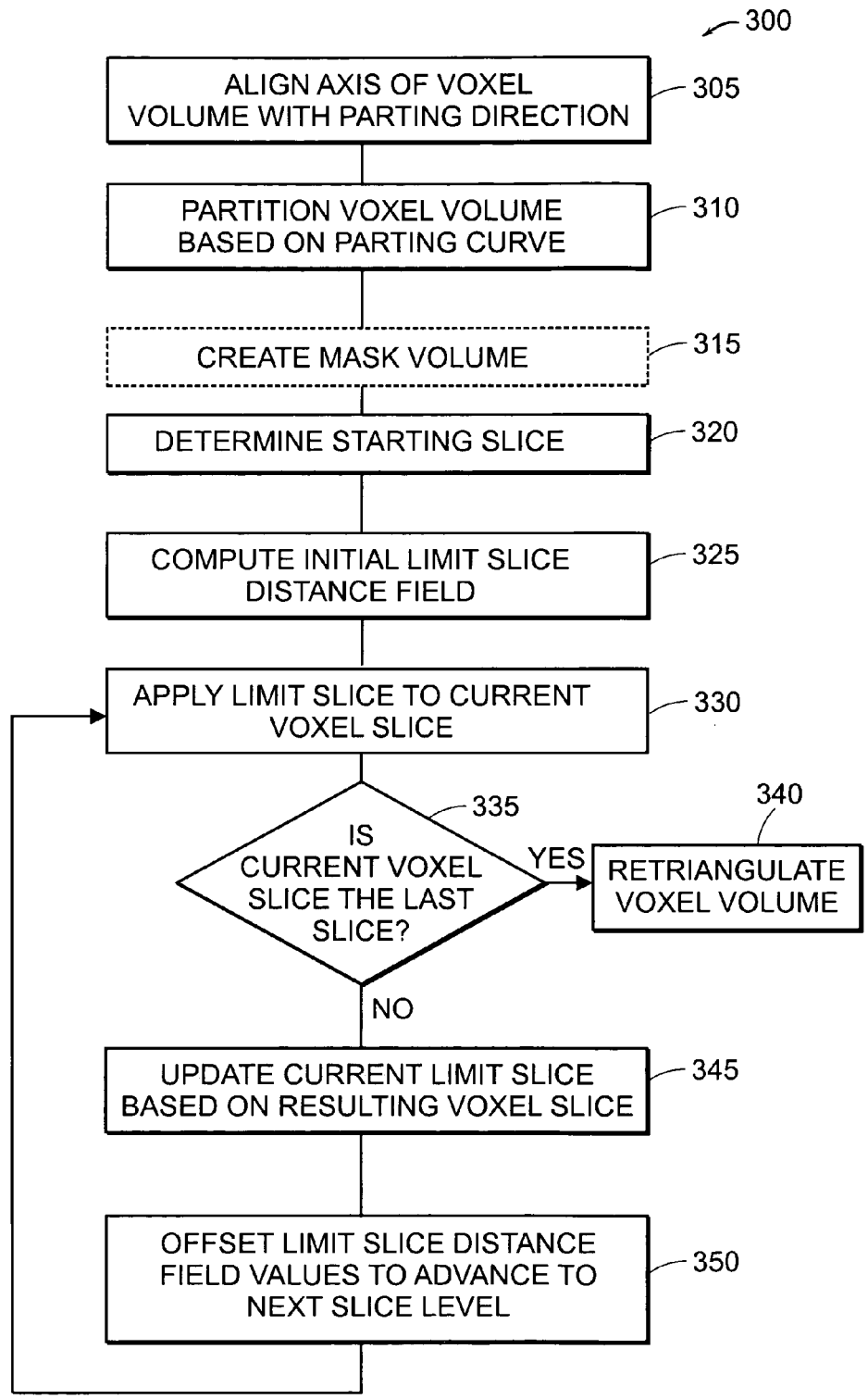
FIG. 3 is a block diagram featuring a method of modifying a voxel-based model of an arbitrarily-shaped 3D object for compliance with a manufacturing constraint, such as draft angle, in which virtual material is added or removed in a slice-by-slice manner, according to an illustrative embodiment of the invention.

FIG. 3 is a block diagram 300 featuring a method of modifying a voxel-based model of an arbitrarily-shaped 3D object for compliance with a manufacturing constraint, such as draft angle, in which virtual material is added or removed in a slice-by-slice manner, according to an illustrative embodiment of the invention. The method of FIG. 3 as described herein below assumes that the parting direction is vertically upward, and that the draft angle is to be fixed in the upper portion of the model above the parting curve. If this is not the case, the voxel representation can be rotated to satisfy this condition. Thus, each slice is a horizontal slice, and the step-wise procedure proceeds vertically upward or downward.

In step 305 of the method 300 of FIG. 3, an axis of the voxel volume representing a 3D model is aligned with a user-defined or automatically-defined three dimensional parting direction along which the mold halves will be pulled apart. The three dimensional parting direction may be a unit vector in three dimensions. Then, in step 310 of the method of FIG. 3, the voxel volume is partitioned along a parting curve. The parting curve, (or set of curves) indicates where the mold halves will part, thereby dividing the surface of the model into an "upper" and "lower" half. In one embodiment, a parting surface is generated based on the parting curve, which is then used to classify each voxel as being either above the parting surface or below the parting surface. Each voxel may be marked as being in either the upper or lower half.

Step 315 of the method of FIG. 3 is an optional step involving the creation of a mask volume. The mask volume includes portions of the model (and/or the space around the model) that are to remain unchanged following application of the automatic modification procedure. The mask volume may be user defined. The mask volume restricts the regions in which modifications may be made, thus allowing increased user control.

Step 320 of the method of FIG. 3 is the determination of the starting (initial) slice. In some embodiments, this step 320 includes determining both the starting and ending slice locations. In a "cut" operation, the initial slice is chosen at the middle of the model near the parting line, and the modification proceeds upward in a slice-by-slice manner. In an "add" operation, the initial slice is chosen at a location above the model, and the modification proceeds downward in a slice-by-slice manner.

Step 325 of the method of FIG. 3 is the computation of the initial limit slice distance field. A limit slice is applied like a template to a corresponding voxel slice, and the distance field of a limit slice is an array of values indicating the distance (i.e. in arbitrary grid units) to the edge of the template. The limit slice accounts for the shape of the model as modified in previous slices, as well as an offset value that is indicated by an imposed minimum draft angle. In a "cut" operation, the initial limit slice is obtained by projecting the parting curve down to the initial slice height (z-value), while offsetting the projected curve conically outward according to the desired draft angle and the distance of projection. This is described in more detail with respect to FIG. 9. In an "add" operation, the initial limit slice is empty.

Steps 330, 335, 345, and 350 are repeated as the method proceeds slice by slice through the 3D model. Step 330 is the application of the current limit slice to the current voxel slice as a template to modify the voxel slice in compliance with the minimum draft angle. In some embodiments, step 330 further includes applying the limit slice to the current voxel slice only where the mask volume allows. In an "add" operation, step 330 includes performing a union operation with the voxel slice and the limit slice that in some cases will add virtual material to the current voxel slice. In a "cut" operation, step 330 includes performing an intersection operation that in some cases will remove virtual material from the current voxel slice.

Next, the method of FIG. 3 proceeds to step 335 to determine whether the current voxel slice is the last slice. If it is, then step 340 retriangulates the voxel volume to obtain the modified, draft-obeying shape. If it is not, the method proceeds to step 345, where the current limit slice is updated based on the resulting voxel slice. The distance field values of the limit slice are further modified in step 350, according to the offset imposed by the minimum draft angle in advancing to the next slice (i.e., see FIG. 9). The resulting limit slice is then applied to the next voxel slice in step 330, and the process continues until the last voxel slice is reached.

Figure 4:
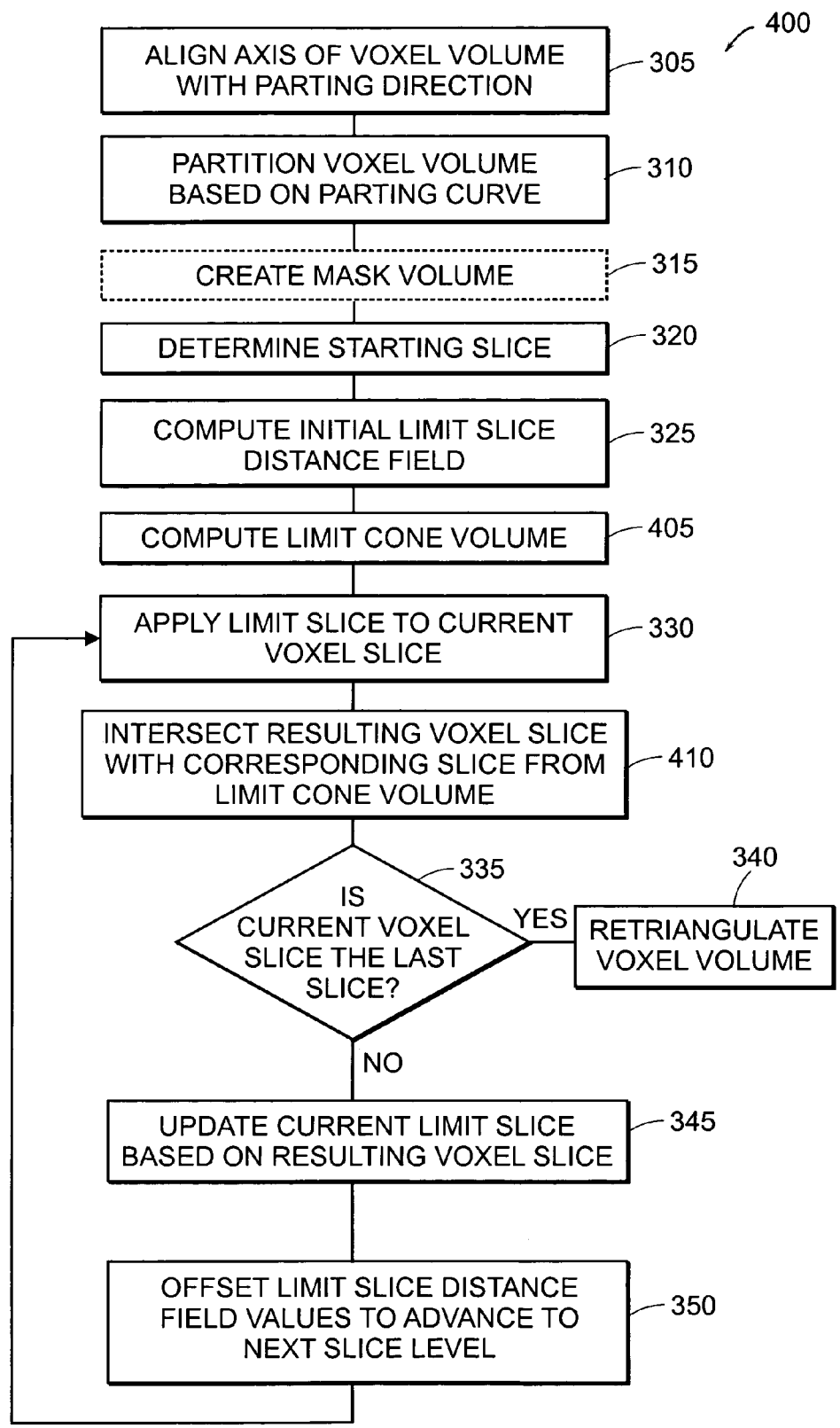
FIG. 4 is a block diagram featuring a method of modifying a voxel-based model of an arbitrarily-shaped 3D object for compliance with a manufacturing constraint, such as draft angle, in which virtual material is added to enforce the constraint and virtual material is removed to preserve the parting curve where mold halves meet, according to an illustrative embodiment of the invention.

FIG. 4 is a block diagram 400 featuring a method of modifying a voxel-based model of an arbitrarily-shaped 3D object for compliance with a manufacturing constraint, such as draft angle, in which virtual material is added to enforce the constraint and virtual material is removed to preserve the parting curve where mold halves meet. As in the method of FIG. 3, the method of FIG. 4 includes the steps of aligning an axis of the voxel volume with the parting direction (step 305); partitioning the voxel volume along a parting curve (step 310); optionally creating a mask volume (step 315); determining a starting slice (step 320); and computing the initial limit slice distance field (step 325). In the case of an "add" operation, since the method begins above the model and proceeds downward, adding material to slices according to an imposed minimum draft angle, the original parting curve near the middle of the object may be enlarged. The method of FIG. 4 performs an "add" operation, but removes material where necessary in order to preserve the original parting curve.

The method in FIG. 4 includes step 405 of computing a limit cone volume (or, analogously, a second limit slice inferred by the limit cone volume). The second limit lo slice is referred to herein as the Parting Curve (PC) base. The PC-base is represented as a two dimensional distance field, and the distance values in it are obtained by projecting the parting curve downward to a plane below the parting line, and then offsetting it outward according to the desired draft angle and the projection distance. Unlike the limit slice, the PC-base is not modified during the slice-wise steps that follow, it is only referenced. Conceptually, the PC-base can be interpreted as a "limit cone volume" implied by the parting curve. Under this interpretation, any material visible outside of this limit cone volume would either violate the draft angle or would require that the parting line be modified outward. Therefore, cutting material outside of this limit volume implies that the parting line will be preserved.

Steps 330, 410, 335, 345, and 350 of the method FIG. 4 are repeated as the method proceeds slice by slice through the 3D model. Step 330 is the application of the current limit slice to the current voxel slice as a template to modify the voxel slice in compliance with the minimum draft angle. In the method of FIG. 4, step 330 includes performing a union operation with the voxel slice and the limit slice. Next, step 410 of the method of FIG. 4 intersects the resulting voxel slice with the corresponding slice from the limit cone volume (which can be determined directly from the PC-base slice, using the vertical distance between the desired limit cone volume slice and the PC-base slice). Step 410 may result in the cutting of virtual material from the model, if that material lies outside the limit cone volume, so that the parting line will be preserved.

The method then proceeds to step 335 to determine whether the current voxel slice is the last slice. If it is, then step 340 retriangulates the voxel volume to obtain the modified, draft-obeying shape. If it is not, the method proceeds to step 345, where the current limit slice is updated with the resulting voxel slice. The distance field values of the limit slice are further modified in step 350, according to the offset imposed by the minimum draft angle in advancing to the next slice. The resulting limit slice is then applied to the next voxel slice in step 330, and the process continues until the last voxel slice is reached.

In some embodiments, it is possible to determine the unique parting line curve automatically given only a description of the model and a pull direction. For example, a sphere has a single unique parting line curve (the equator) for any pull direction. Other models may have several distinct valid parting line curves given a description of the model and a pull direction. For these generally more complex situations, the user may be prompted to specify additional information to select one particular parting line curve.

In one embodiment, the method generates a valid parting line curve by identifying each triangle in the model as being either "forward" or "backward"-facing with respect to the pull direction. Then, the method looks through the triangles and collects all edges that have one forward and one backward facing neighboring triangle. The method connects these edges into a curve, thus separating the "front" half of the model from the "back" half. This method is useful for certain models, including the sphere example above.

There is generally more than one valid parting line curve for models with surface elements (i.e. triangles) whose normals are perpendicular to the pull direction. Conceptually, these are models with "flat sides." One example is a model in the shape of a cube with pull direction pointing directly up (for example, see FIG. 1A). Any curve which runs around the four sides of the cube may be a valid parting line curve, but there are many such curves. Thus, for some applications, a method of the invention includes having a user choose a specific parting line curve.

FIGS. 5–8 and 10–17 demonstrate various steps in the methods of FIGS. 3 and 4 using representations of simplified limit slices and voxel slices. Here, the representations are 9×9 arrays of values, although it should be understood that realistic slices generally contain much more data.

In the figures described herein below, distance field values of limit slices are scaled such that the distance between adjacent grid-points is 1.0. The "edge" of the limit volume implied by this limit slice is determined by finding the contour of points whose distance value is 0.0. Alternatively, another scaling convention may be used.

The distance field of a given limit slice is preferably an evenly-spaced grid of distance values. The value at each grid point represents the shortest 2D distance in the slice plane to the intersection of the surface of the limit volume with the current slice. These distances are measured in two-dimensions and represent the distance in "grid" units. For closed curve loops, a sign bit is added to each distance value, to indicate if the point lies inside (positive) or outside (negative) the curve loop. Thus, a distance-field grid point with a value of 1.0 implies that the curve approaches that grid-point to a distance of 1.0, but not closer. If a circle of radius 1.0 were drawn around the grid point, the curve would touch the circle at some point, but would not enter the circle.

Here, distance fields can serve at least two roles. One role is to take a planar curve and to determine a distance field based on that curve. Another role is that once a distance field is obtained, its values can be analyzed and curves may be found in that distance field. Thus, the role of the distance fields includes (1) finding a locus of points and (2) connecting these points by a curve. The locus of all points with distance value 0 provides the original curve. If all points having distance value d are found, where d>0, then one or more curve loops can be generated which represent the original curve "shrunk inward" by a distance d. Conversely, one or more curve loops which represent the original curve "grown outward," or "inflated" may be generated by finding all points for a given negative d (i.e., d<0). Thus, the limit slice at a given level k captures the shape of the object at that level. In some embodiments the invention then offsets all distance values by the amount that the draft angle implies, and the result is the offset of the 0-valued iso-line, shrinking inward or growing outward as appropriate. The modified limit may then be applied to the next slice.

The voxel slices illustrated in the following figures have iso-values (voxel values) that are also distributed over a uniform 9×9 grid. Each iso-value lies in the range [0,255], where 0 implies empty space, 255 implies solid material inside the model, and the surface is defined to lie at 128. In some embodiments, the iso-values are scaled such that they transition from 0 to 255 over a distance of 4 grid-spaces, changing by at most 64 between adjacent grid-points. This scaling approach is complementary to haptic rendering approaches, as applied to the voxel model. In some embodiments, the interior of the voxel model slices have iso-values greater than 128. Here, a voxel slice is a type of restricted distance field. However, iso-values change 64 times as quickly as distance values, and the "surface" of a voxel volume is defined to be the contour of value 128, instead of the contour of distance 0 used by distance fields. Additionally, in some embodiments, iso-values are limited to the range [0,255], while distance field values can have any magnitude.

Figure 5:
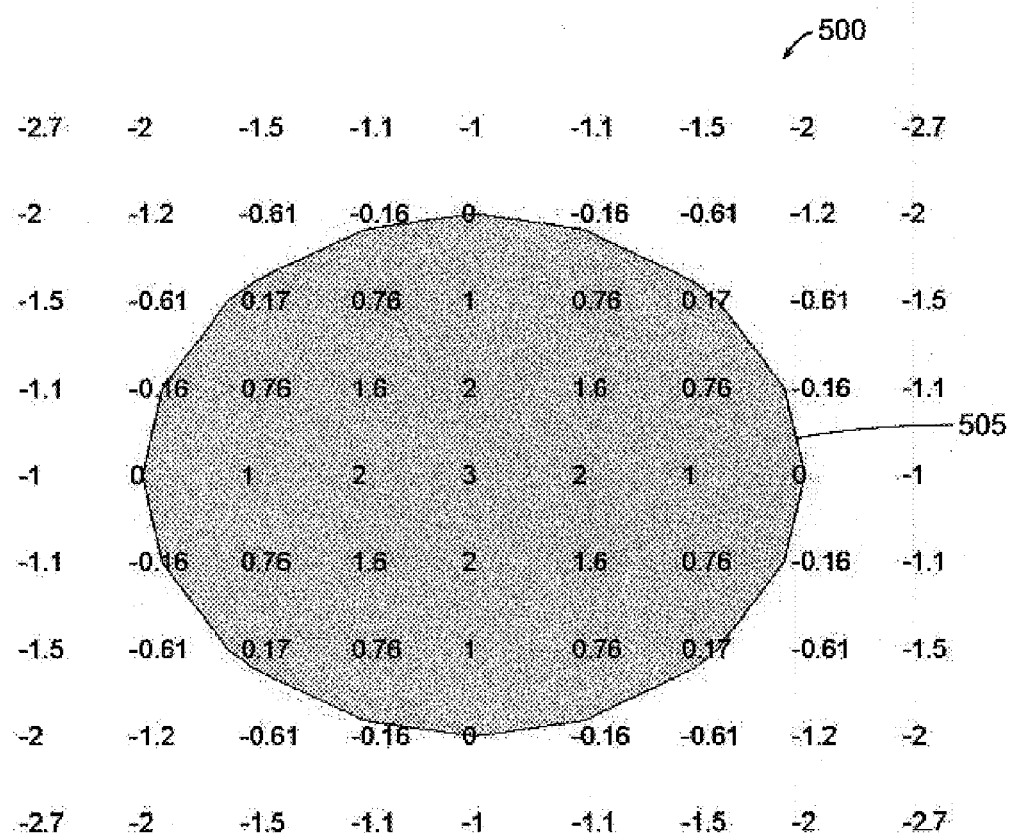
FIG. 5 is a schematic diagram representing a simplified array of distance field values of a limit slice used in the method of FIG. 3 to remove virtual material from a 3D voxel-based model (a "cut" operation), according to an illustrative embodiment of the invention.

FIGS. 5–11 illustrate a "cut" operation according to one embodiment of the method of FIG. 3. FIG. 5 is a schematic diagram representing a simplified array of distance field values of a limit slice 500 used in the method of FIG. 3 to remove virtual material from a 3D voxel-based model. This limit slice 500 is referred to herein as $L_0$ and defines the curve 505, determined according to the above-described sequence of operations of FIG. 3 (steps 305, 310, 320, and 325). $L_0$ is to be applied to a corresponding voxel slice, $V_0$, in step 330 of the method of FIG. 3.

Figure 6:
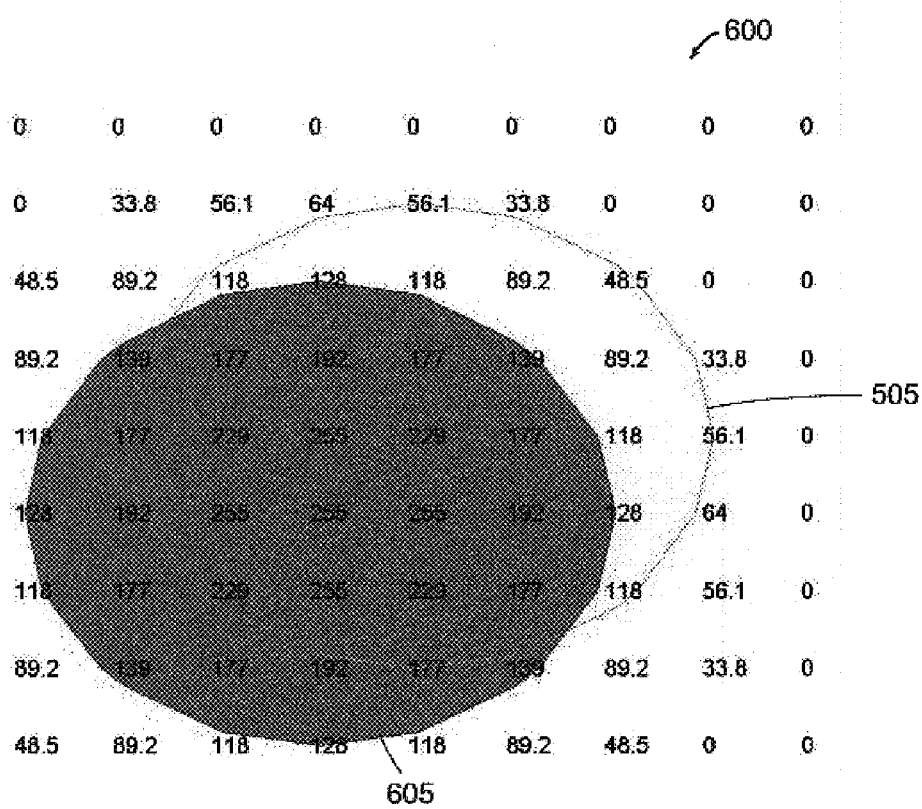
FIG. 6 is a schematic diagram representing a simplified array of voxel values of a slice of the 3D model to which the limit slice of FIG. 5 will be applied as a template in the cut operation, according to an illustrative embodiment of the invention.

FIG. 6 is a schematic diagram representing $V_0$, a simplified array of voxel values 600 of a slice of the 3D model to which the limit slice of FIG. 5, $L_0$, will be applied as a template in the cut operation. Curve 605 in the voxel slice represents the location of the surface of the 3D model in this slice. Curve 505 from the limit slice $L_0$ (converted to corresponding iso-values) is shown for reference.

In order to apply the limit slice $L_0$ to the voxel slice $V_0$ during a "cut" operation (for example, in step 330 of the method of FIG. 3), $V_0$ and $L_0$ are intersected using a min( ) operation, as shown in Equation 1 as follows:

$$V_1 = \min(V_0, L_0) \quad (1)$$

where $V_1$ is the resulting voxel slice. The limit slice values are converted to voxel values before taking the minimum, for example, by multiplying by 64.0, then adding 128, and finally clamping to the range [0,255]. Clamping sets the value to 0 if the result is less than 0 and sets the value to 255 if the result is greater than 255. This is generally necessary where the voxel slice contains 8-bit integer values, which can only represent values in the range [0,255]. In some embodiments the method may be adapted for use with other bit-length values, for example.

Figure 7:
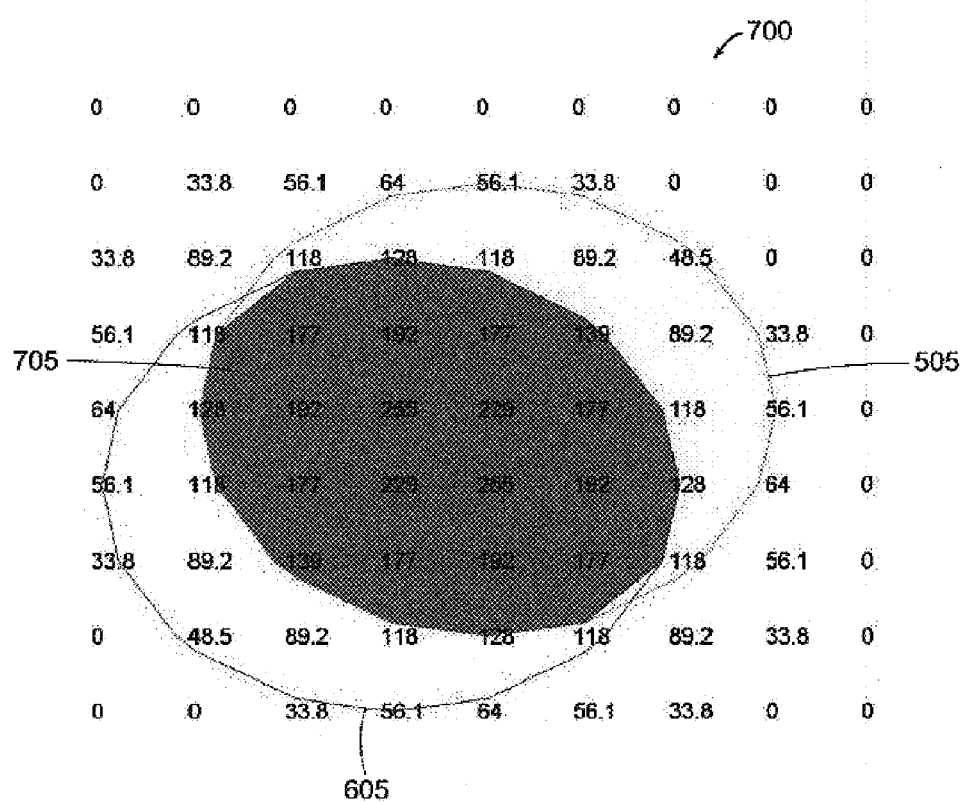
FIG. 7 is a schematic diagram representing a simplified array of voxel values of the slice of the 3D model shown in FIG. 6 following removal of virtual material by application of the limit slice, according to an illustrative embodiment of the invention.

FIG. 7 shows the resulting array of voxel values 700 following the intersection of $V_0$ and $L_0$. The resulting voxel slice is $V_1$, as computed according to Equation 1 above. The darkened region 705 represents virtual material remaining in the current voxel slice following application of the limit slice.

Figure 8:
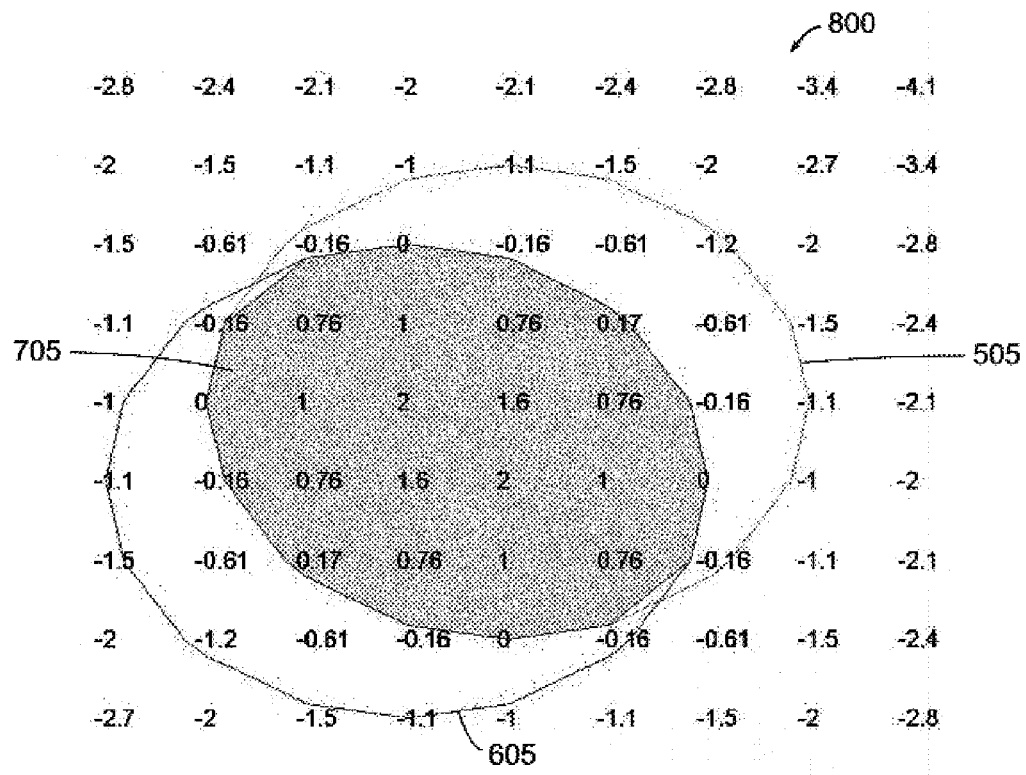
FIG. 8 is a schematic diagram representing a simplified array of distance field values of the limit slice of FIG. 5, updated to correspond to the newly-modified slice of the 3D model, according to an illustrative embodiment of the invention.

Now that the current voxel slice has been updated, the current limit slice is updated with the resulting voxel slice according to step 345 of the method of FIG. 3. FIG. 8 is a schematic diagram representing the limit slice $L_1$ (reference 800) following modification according to the updated voxel slice, $V_1$. $L_1$ is obtained by converting the voxel values in $V_1$ into distance-field values, and then intersecting $L_0$ with $V_1$ according to Equation 2 as follows:

$$L_1 = \min(L_0, V_1) \quad (2)$$

Figure 9:
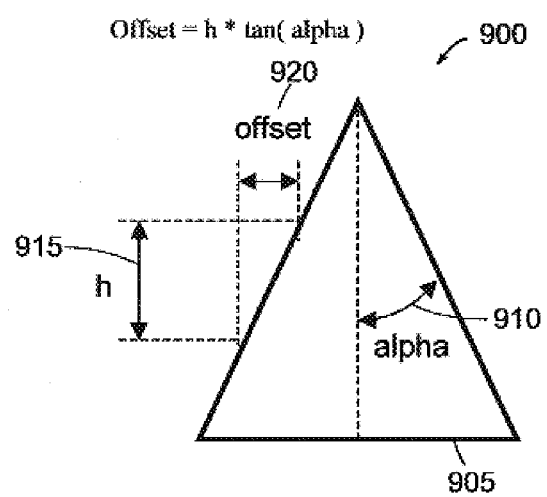
FIG. 9 is a schematic diagram illustrating the determination of an offset value as a function of a given draft angle and a given distance between slices of the 3D model, according to an illustrative embodiment of the invention.

The distance field values of the limit slice $L_1$ are further modified in step 350 of the method of FIG. 3, according to the offset imposed by the minimum draft angle in advancing to the next slice. FIG. 9 is a schematic diagram 900 illustrating the determination of an offset value 920 as a function of a given draft angle "alpha" 910 and a given distance "h" 915 between slices of the voxel volume. This offset 920 represents the distance by which the radius of a cone 905 (with cone-angle alpha 910) shrinks as a slice through that cone proceeds upward by a distance h 915. This offset is determined according to Equation 3 as follows:

$$\text{Offset} = h^* \tan(\text{alpha}) \quad (3)$$

For example, where alpha=20 degrees and h=1, the corresponding offset=0.364. The offset is applied to $L_1$, and a new limit slice $L_2$ is obtained, according to Equation 4 as follows:

$$L_2 = L_1 - \text{offset} \quad (4)$$

Figure 10:
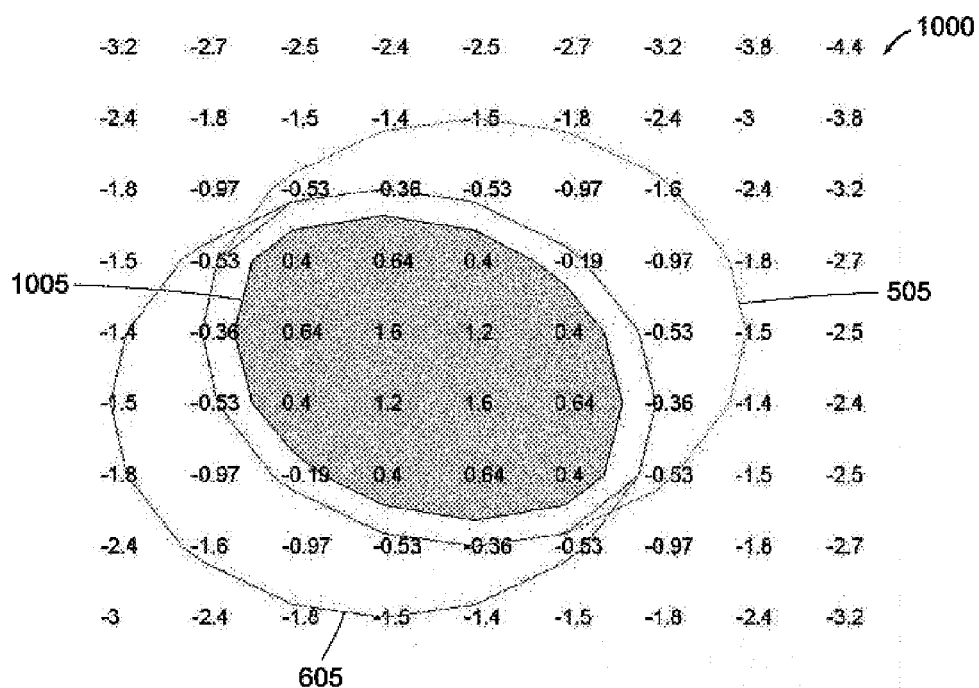
FIG. 10 is a schematic diagram representing a simplified array of distance field values of the limit slice of FIG. 8, modified according to an offset value, for application as a template against the next slice of the 3D model, according to an illustrative embodiment of the invention.

FIG. 10 is a schematic diagram representing the array of distance field values $L_2$ (reference 1000) following modification according to an offset value.

Figure 11:
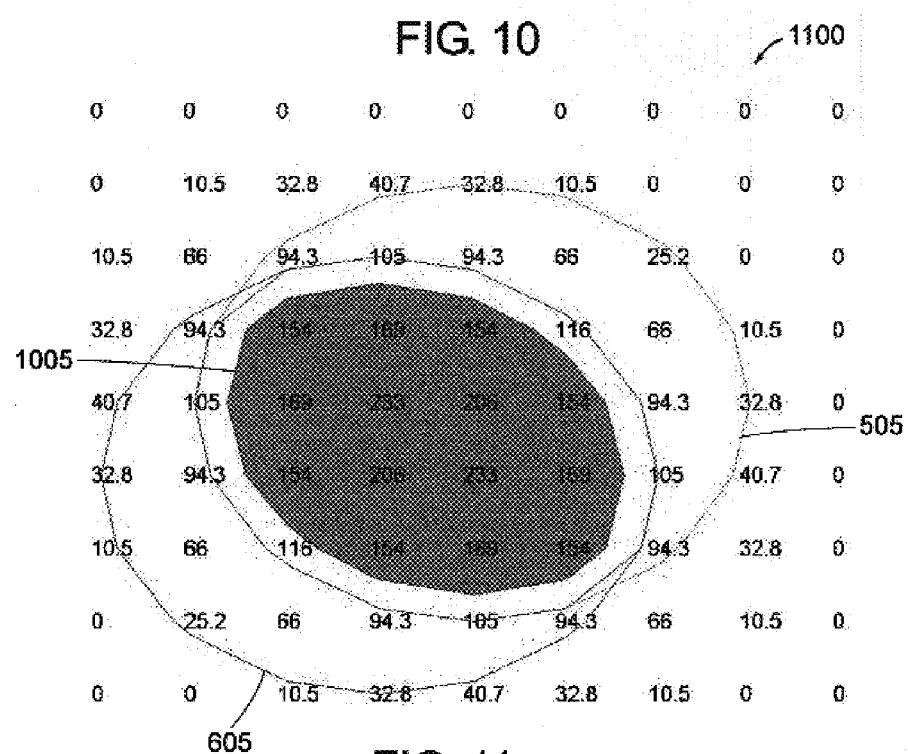
FIG. 11 is a schematic diagram representing a simplified array of voxel values of the next slice of the 3D model following application of the limit slice of FIG. 10, according to an illustrative embodiment of the invention.

The "cut" operation proceeds according to the method of FIG. 3 by advancing to the next slice of the voxel volume and applying limit slice $L_2$. FIG. 11 shows the resulting voxel slice 1100 following application of limit slice $L_2$. In this case, the new voxel slice, before application of limit slice $L_2$, was similar to previous voxel slice $V_0$, but, of course, the method would work where the new voxel slice, prior to application of the corresponding limit slice, differs from $V_0$ more prominently.

FIGS. 12–17 illustrate an "add" operation according to the method of FIG. 3. In these Figures, material is added as the slices move down from the outside of the model toward the parting line curve. The depicted slices are simplified for illustrative purposes. Realistic slices may contain significantly more data. In some embodiments of the "add" operation, the limit slice represents a lower bound, i.e., a minimum volume that the voxel slice contains, although the voxel slice may also contain other areas that the limit does not yet require. As the slices progress toward the parting line, the solid area of the model represented by the voxel and limit slices grows.

Figure 12:
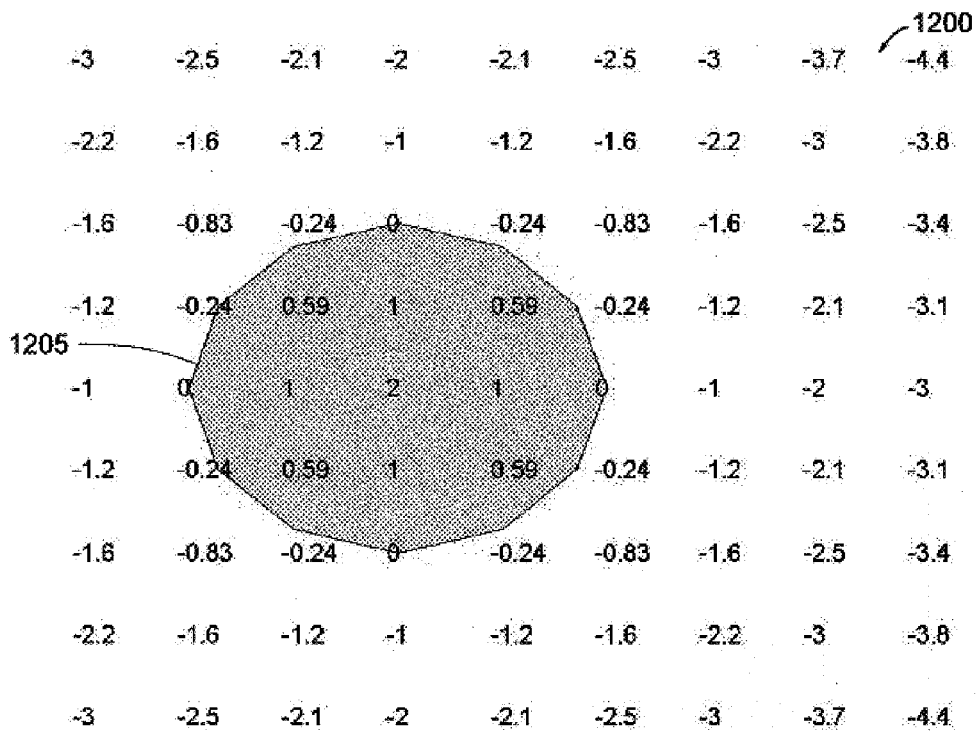
FIG. 12 is a schematic diagram representing a simplified array of distance field values of a limit slice used in the method of FIG. 3 to add virtual material to a 3D voxel-based model (an "add" operation), according to an illustrative embodiment of the invention.

FIG. 12 is a schematic diagram representing an exemplary array 1200 of distance field values of a limit slice $L_0$ used in an "add" operation, according to an embodiment of the method of FIG. 3. The limit slice $L_0$ defines the curve 1205, and is determined according to the above-described sequence of operations of FIG. 3 (steps 305, 310, 320, and 325). $L_0$ is to be applied to a corresponding voxel slice, $V_0$, in step 330 of the method of FIG. 3.

Figure 13:
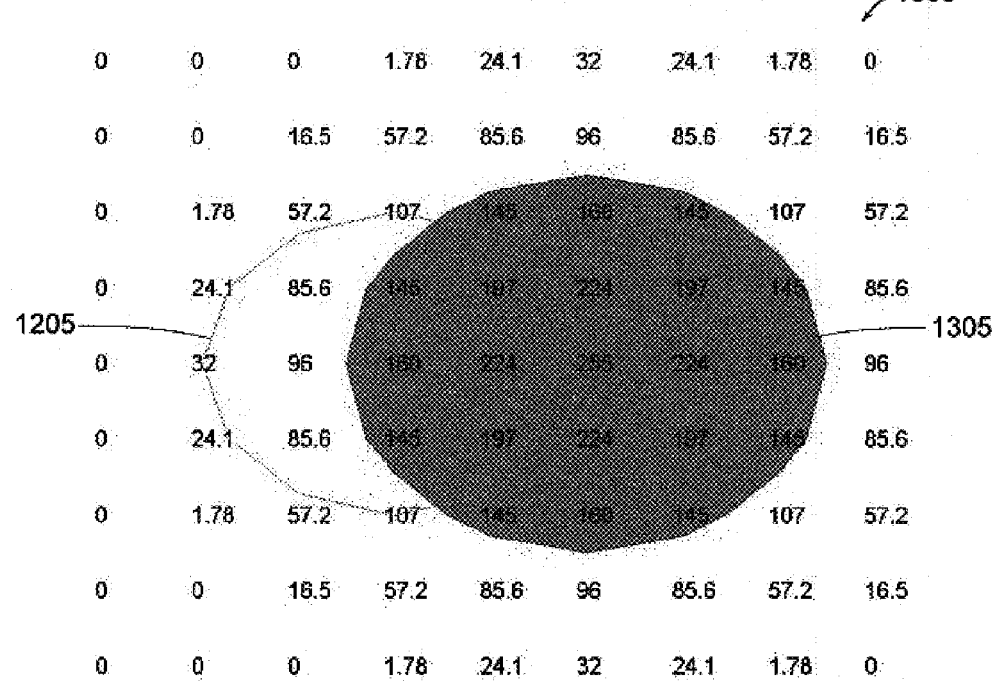
FIG. 13 is a schematic diagram representing a simplified array of voxel values of a slice of the 3D model to which the limit slice of FIG. 12 will be applied in the add operation, according to an illustrative embodiment of the invention.

FIG. 13 is a schematic diagram representing $V_0$, an array of voxel values 1300 of a slice of the 3D model to which the limit slice 1200 of FIG. 12, $L_0$, will be applied in the "add" operation. Curve 1305 in the voxel slice represents the location of the surface of the 3D model in this slice. Curve 1205 from the limit slice (converted to corresponding iso-values) is shown for reference.

In order to apply the limit slice $L_0$ to the voxel slice $V_0$ during in an "add" operation (for example, in step 330 of the method of FIG. 3), the union of $V_0$ and $L_0$ is determined using a max( ) operation, as shown in Equation 5 as follows:

$$V_1 = \max(V_0, L_0) \quad (5)$$

where $V_1$ is the resulting voxel slice. The limit slice values are converted to voxel values before taking the maximum.

Figure 14:
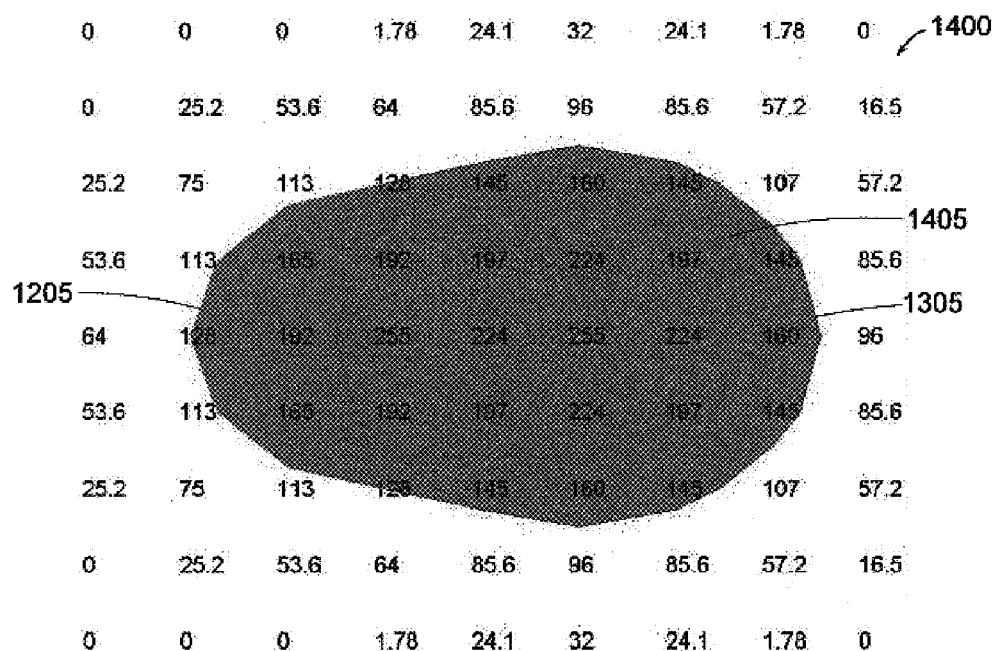
FIG. 14 is a schematic diagram representing a simplified array of voxel values of the slice of the 3D model shown in FIG. 13 following addition of virtual material by application of the limit slice as a template, according to an illustrative embodiment of the invention.

FIG. 14 shows the resulting array of voxel values 1400 following the unioning of $V_0$ with $L_0$. The resulting voxel slice is $V_1$, as computed according to Equation 5 above. The darkened region 1405 represents virtual material in the current voxel slice following application of the limit slice (via unioning).

Figure 15:
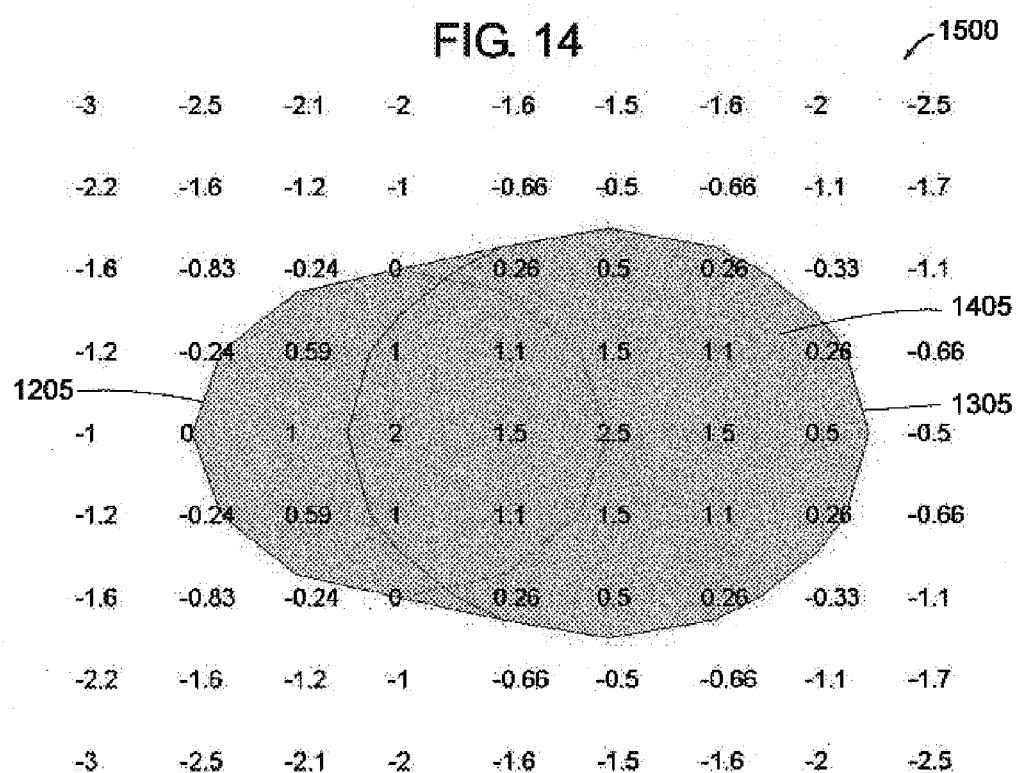
FIG. 15 is a schematic diagram representing a simplified array of distance field values of the limit slice of FIG. 12, updated to correspond to the newly-modified slice of the 3D model, according to an illustrative embodiment of the invention.

Now that the current voxel slice has been updated, the current limit slice is updated with the resulting voxel slice according to step 345 of the method of FIG. 3. FIG. 15 is a schematic diagram representing the limit slice $L_1$ 1500 following modification according to the updated voxel slice, $V_1$. $L_1$ is obtained by converting the voxel values in $V_1$ into distance-field values, and then unioning $L_0$ with $V_1$, according to Equation 6 as follows:

$$L_1 = \max(L_0, V_1) \quad (6)$$

Conversion of voxel values into distance-field values may involve "undoing" the clamping of values to the range [0,255]. For example, the voxel value 0 is converted to a distance value of $-\infty$, and the voxel value 255 is converted to a distance value of $\infty$.

The method of FIG. 3 in this "add" operation now proceeds to the next slice (downward, toward the parting curve), and step 350 is performed. This step involves offsetting the limit slice $L_1$ by a distance that is related to both the desired angle "alpha" as well as the distance "h" between slices, as illustrated in the schematic diagram of FIG. 9. In this case, the offset is added to the limit values, not subtracted as in the "cut" operation. As a result, the contour of the limit slice grows rather than shrinks. Conceptually, this offset represents the distance by which the radius of a cone (with con-angle alpha) grows as a slice through that cone proceeds by a distance h. The offset is applied to $L_1$ and a new limit slice $L_2$ is obtained, according to Equation 7 as follows:

$$L_2 = L_1 + \text{offset} \tag{7}$$

Figure 16:
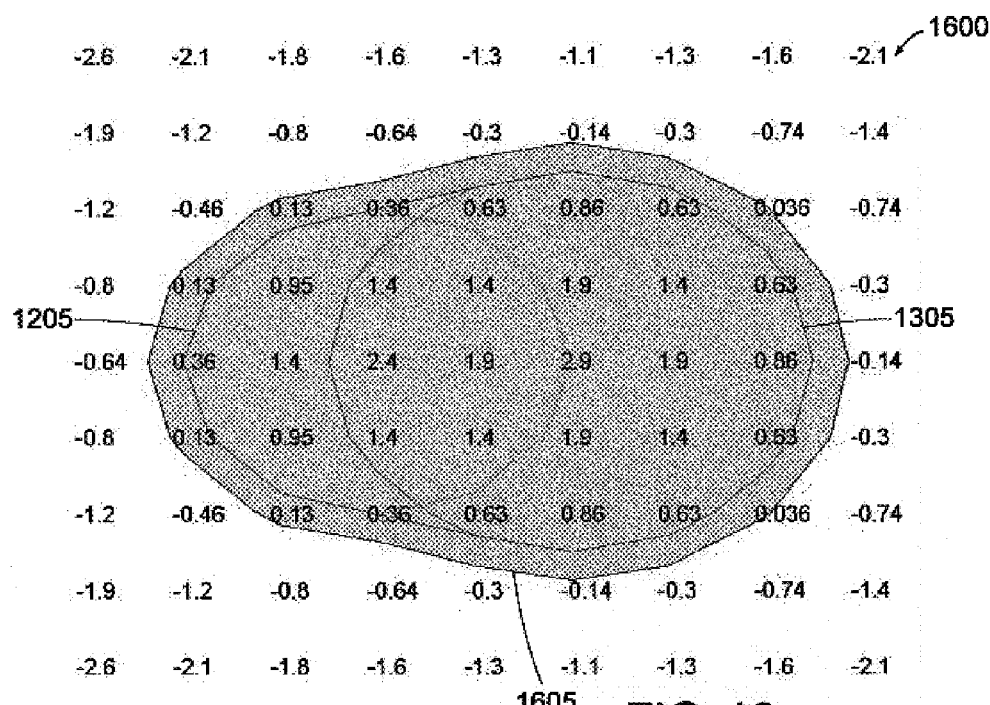
FIG. 16 is a schematic diagram representing a simplified array of distance field values of the limit slice of FIG. 15, modified according to an offset value, for application as a template against the next slice of the 3D model, according to an illustrative embodiment of the invention.

FIG. 16 is a schematic diagram representing the array of distance field values $L_2$ 1605 following modification according to an offset value.

Figure 17:
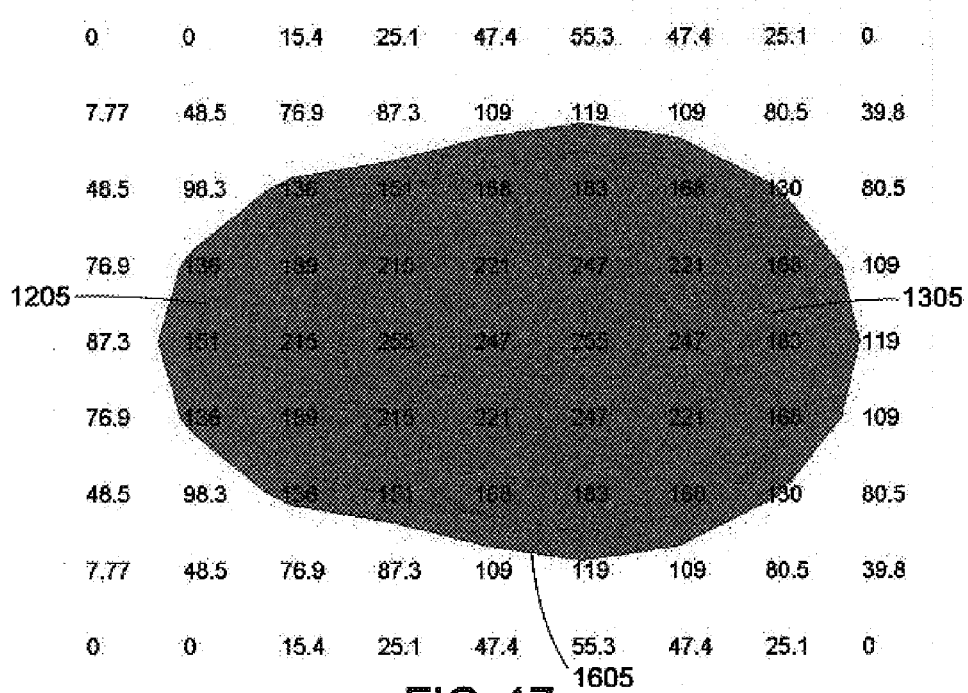
FIG. 17 is a schematic diagram representing a simplified array of voxel values of the next slice of the 3D model following application of the limit slice of FIG. 16, according to an illustrative embodiment of the invention.

The "add" operation proceeds according to the method of FIG. 3 by advancing to the next slice of the voxel volume and applying limit slice $L_2$. FIG. 17 shows the resulting voxel slice 1700 following application of limit slice $L_2$. In this case, the new voxel slice, before application of limit slice $L_2$, was similar to previous voxel slice $V_0$, but, of course, the method would work where the new voxel slice, prior to application of the corresponding limit slice, differs from $V_0$ more prominently.

Figure 18A:
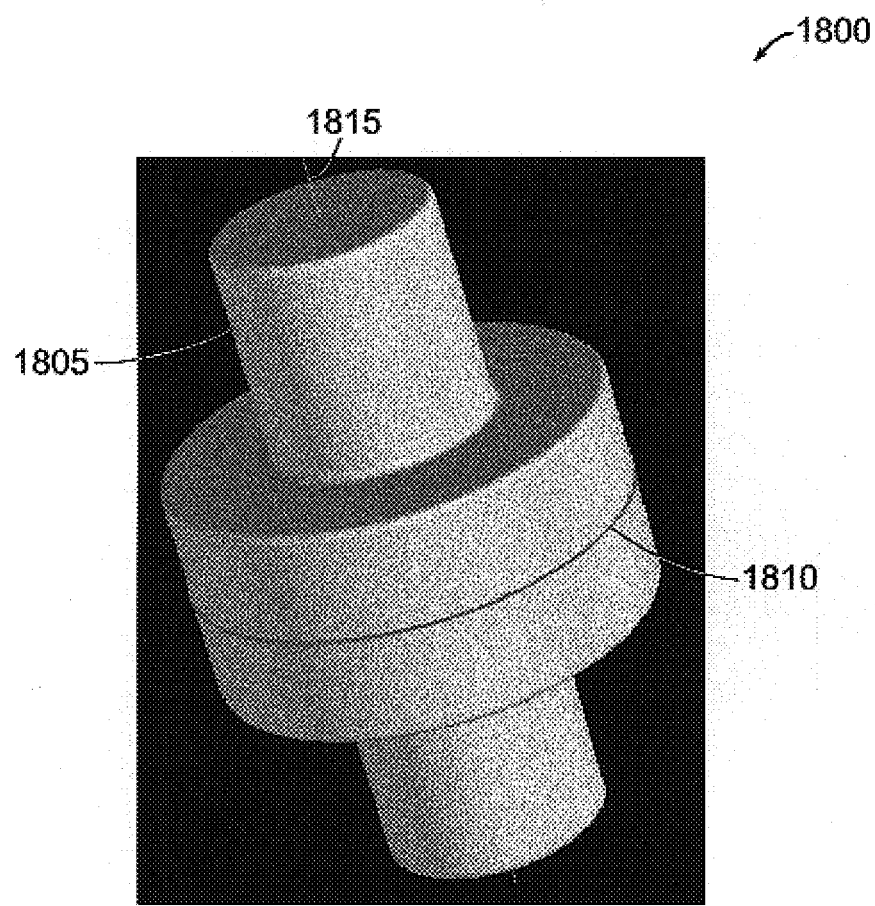
FIG. 18A is a screenshot of a 3D model with a mold parting curve and parting direction as shown; the sides of the model are essentially parallel to the parting direction and do not provide adequate draft for extraction from a mold.

FIGS. 18A to 18D demonstrate application of the methods of FIGS. 3 and 4 to an exemplary 3D model. These particular examples employ a rather large draft angle of 15 degrees to illustrate the results more clearly. Any draft angle may be chosen. For example, in certain applications, a draft angle of 10 degrees or less, 5 degrees or less, 3 degrees or less, 2 degrees or less, or 1 degree or less may be used. Of course, values greater than 10 degrees may be used as well. FIG. 18A is a screenshot 1800 of a 3D model with a mold parting curve 1810 and parting direction 1815 as shown. The sides of the model are essentially parallel to the parting direction 1815 and do not provide adequate draft for extraction from a mold.

Figure 18B:
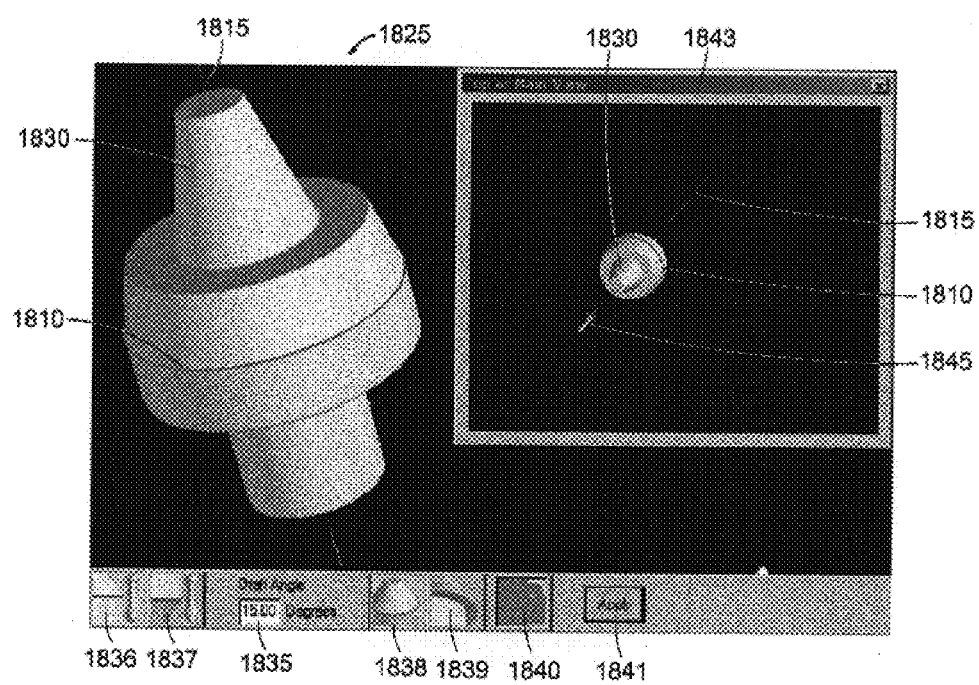
FIG. 18B is a screenshot of the 3D model of FIG. 18A following a "cut" operation to remove virtual material from the model for compliance with a specified minimum draft angle, according to an illustrative embodiment of the invention.

FIG. 18B is a screenshot 1825 of the 3D model of FIG. 18A following a "cut" operation, according to the method of FIG. 3, to remove virtual material from the model 1830 for compliance with the specified minimum draft angle of 15 degrees. A supplementary view 1843 of the object is provided in the screenshot 1825, and control buttons are provided 1835, 1836, 1837, 1838, 1839, 1840, and 1841.

Figure 18C:
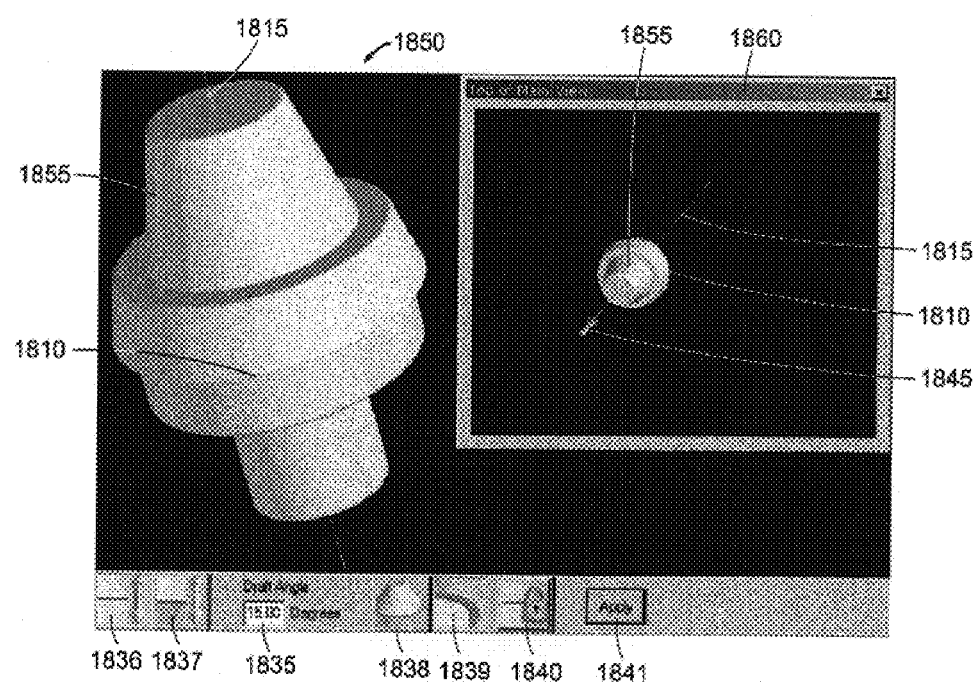
FIG. 18C is a screenshot of the 3D model of FIG. 18A following an "add" operation to add virtual material to the model for compliance with a specified minimum draft angle, according to an illustrative embodiment of the invention.

FIG. 18C is a screenshot 1850 of the 3D model of FIG. 18A following an "add" operation, according to the method of FIG. 3, to add virtual material to the model 1855 for compliance with a specified minimum draft angle. Note that the result of the "add" operation has obscured the original parting curve 1810. A supplementary view 1860 of the object is provided in the screenshot 1850, and control buttons are provided 1835, 1836, 1837, 1838, 1839, 1840, and 1841.

Figure 18D:
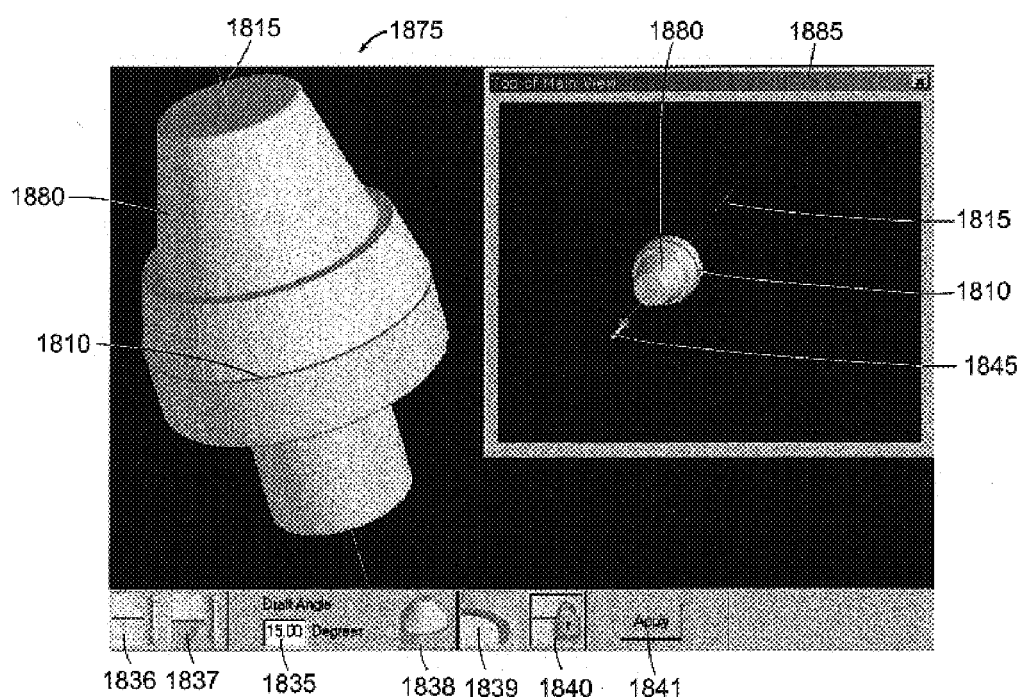
FIG. 18D is a screenshot of the 3D model of FIG. 18A following an "add while preserving parting line" operation to add virtual material to the model for compliance with a specified minimum draft angle without obscuring the original mold parting curve, according to an illustrative embodiment of the invention.

FIG. 18D is a screenshot 1875 of the 3D model of FIG. 18A following an "add while preserving parting line" operation, according to the method of FIG. 4, to add virtual material to the model for compliance with a specified minimum draft angle without modifying or obscuring the original mold parting curve. A supplementary view 1885 of the object is provided in the screenshot 1875, and control buttons are provided 1835, 1836, 1837, 1838, 1839, 1840, and 1841.

The invention includes an apparatus for performing the methods described herein. The apparatus includes a memory for storing a code that defines a set of instructions, and a processor for executing the set of instructions for performing the methods of the invention.

The apparatus may include a haptic and/or graphical user interface device (HWGUI device) in communication with the processor. For example, the H/GUI device may be the Phantom® haptic interface device manufactured by SensAble Technologies, Inc., in Woburn, Mass., described in U.S. Pat. No. 6,417,638, issued to Rodomista et al. The HI/GUI device 2712 allows a user to manipulate a cursor/tool and/or provides haptic feedback to the user. Force associated with the haptic feedback may be determined. Furthermore, an embodiment of the invention includes a haptic/graphical user interface element (widget) to facilitate user interaction in the methods described herein.

A computer hardware apparatus may be used in carrying out any of the methods described herein. The apparatus may include, for example, a general purpose computer, an embedded computer, a laptop or desktop computer, or any other type of computer that is capable of running software, issuing suitable control commands, receiving graphical user input, and recording information. The computer typically includes one or more central processing units for executing the instructions contained in software code that embraces one or more of the methods described herein. The software may include one or more modules recorded on machine-readable media, where the term machine-readable media encompasses software, hardwired logic, firmware, object code, and the like. Additionally, communication buses and I/O ports may be provided to link any or all of the hardware components together and permit communication with other computers and computer networks, including the internet, as desired.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method for automatically modifying a model of a three-dimensional object for compliance with a manufacturing constraint, the method comprising the steps of:
    (a) representing a model of an arbitrarily-shaped three-dimensional object with an array of voxel values; and
    (b) automatically modifying the array of voxel values according to a manufacturing constraint, wherein the manufacturing constraint comprises a molding constraint.

2. The method of claim 1, wherein the manufacturing constraint comprises a draft angle specification.

3. The method of claim 2, wherein the draft angle specification is user-provided.

4. The method of claim 2, wherein the manufacturing constraint further comprises at least one of a parting curve and a parting direction.

5. The method of claim 4, wherein the manufacturing constraint comprises a plurality of parting curves.

6. The method of claim 4, wherein the manufacturing constraint comprises at least one non-planar parting curve.

7. The method of claim 2, wherein the manufacturing constraint further comprises a mask volume indicating a portion of the model to remain unmodified.

8. The method of claim 1, further comprising at least one of the steps of:
(c) saving the modified array of voxel values to a data storage medium;
(d) displaying the model on a visual display following step (b);
(e) transmitting a copy of the modified array of voxel values over a network;
(f) providing a printed representation of the model following step (b); and
(g) creating a physical three-dimensional representation of the model following step (b).

9. The method of claim 1, further comprising the step of:
(c) graphically rendering the model.

10. The method of claim 9, further comprising the step of:
(d) haptically rendering the model.

11. The method of claim 1, further comprising the step of:
(c) generating a surface mesh corresponding to the modified array of voxel values.

12. The method of claim 11, wherein step (c) comprises using a marching cubes algorithm.

13. The method of claim 1, wherein step (b) is initiated by a user command.

14. The method of claim 1, wherein step (b) comprises a post-processing step.

15. The method of claim 1, wherein step (b) comprises adding virtual material to the model.

16. The method of claim 15, wherein the step of adding virtual material to the model comprises modifying the array of voxel values representing the model to increase a volume encompassed by the model.

17. The method of claim 1, wherein step (b) comprises removing virtual material from the model.

18. The method of claim 17, wherein the step of removing virtual material from the model comprises modifying the array of voxel values representing the model to decrease a volume encompassed by the model.

19. The method of claim 1, wherein step (b) comprises:
(i) adding virtual material to the model; and
(ii) removing virtual material from the model to preserve a given parting curve.

20. The method of claim 1, further comprising the step of automatically determining at least one of a parting curve and a parting direction.

21. The method of claim 1, wherein step (b) comprises modifying voxel values corresponding to each of a plurality of slices of the model.

22. The method of claim 21, wherein the slices are contiguous.

23. The method of claim 22, wherein step (b) comprises sequentially modifying the slices of the model.

24. The method of claim 21, wherein step (b) comprises determining a limit slice for use as a template in modifying voxel values corresponding to a given slice of the model.

25. The method of claim 24, wherein step (b) comprises modifying the limit slice using at least one of:
(i) a previously-modified slice; and
(ii) an offset value.

26. The method of claim 24, wherein the limit slice comprises distance field values indicating distances from an edge of a limit volume, and wherein the distance field values are related to voxel values.

27. The method of claim 1, wherein the array of voxel values comprises one-byte integers.

28. The method of claim 1, wherein the array of voxel values consists essentially of one-byte integers.

29. An apparatus for automatically modifying a model of a three-dimensional object to enforce compliance with a manufacturing constraint, the apparatus comprising:
(a) a memory for storing code that defines a set of instructions; and
(b) a processor adapted to execute the set of instructions to:
(i) represent a model of an arbitrarily-shaped three-dimensional object with an array of voxel values; and
(ii) modify the array of voxel values according to a manufacturing constraint, wherein the manufacturing constraint comprises a molding constraint.

30. The apparatus of claim 29, further comprising:
(c) a graphical user interface device in communication with the processor.

31. The apparatus of claim 30, wherein the graphical user interface device comprises a haptic/graphical user interface device.

32. The apparatus of claim 29, further comprising at least one of:
(c) a data storage medium for storing the modified array of voxel values;
(d) a visual display for displaying the modified model;
(e) a network for transmitting a copy of the modified array of voxel values;
(f) a printer for providing a printed representation of the modified model; and
(g) a three-dimensional printer for creating a physical three-dimensional representation of the modified model.

33. The apparatus of claim 29, wherein the processor is adapted to execute the set of instructions to provide a haptic/graphical user interface element.

34. A method for automatically determining a modification of a model of a three-dimensional object for compliance with a specified draft angle, the method comprising the steps of:
(a) representing a model of an arbitrarily-shaped three-dimensional object with an array of voxel values; and
(b) automatically determining a modification of the array of voxel values for compliance with a draft angle.

35. The method of claim 34, wherein the draft angle is user-specified.

36. The method of claim 34, wherein step (b) comprises determining a modification for compliance with the draft angle and at least one of a parting curve and a parting direction.

37. The method of claim 34, wherein step (b) comprises determining a modification subject to a mask volume, wherein the mask volume indicates a portion of the model to remain unmodified.

38. The method of claim 34, further comprising the step of:
(c) modifying the model according to the automatically determined modification of the array of voxel values.

39. The method of claim 38, further comprising at least one of the steps of:
(d) saving a representation of the modified model to a data storage medium;
(e) displaying the modified model on a visual display;
(f) transmitting a copy of the modified model over a network;
(g) providing a printed representation of the modified model; and (h) creating a physical three-dimensional representation of the modified model.

40. The method of claim 38, further comprising the step of:
(d) graphically rendering the modified model.

41. The method of claim 40, further comprising the step of:
(e) haptically rendering the modified model.

42. The method of claim 34, wherein step (b) comprises determining a modification of the array of voxel values corresponding to each of a plurality of slices of the model.

43. The method of claim 42, wherein the slices are contiguous.

44. The method of claim 43, wherein step (b) comprises determining a modification of each of the slices of the model in a step-wise manner.

45. The method of claim 42, wherein step (b) comprises determining a limit slice for use as a template in determining a modification of voxel values corresponding to a given slice of the model.

46. The method of claim 45, wherein step (b) comprises modifying the limit slice using an offset value.

47. The method of claim 45, wherein the limit slice comprises distance field values indicating distances from an edge of a limit volume, and wherein the distance field values are related to voxel values.

48. The method of claim 34, wherein the array of voxel values consists essentially of one-byte integers.

* * * * *